(12) United States Patent
Dewa

(10) Patent No.: US 10,469,917 B2
(45) Date of Patent: Nov. 5, 2019

(54) RECEPTION DEVICE, RECEPTION METHOD, AND TRANSMISSION METHOD

(71) Applicant: SATURN LICENSING LLC, New York, NY (US)

(72) Inventor: Yoshiharu Dewa, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/900,458

(22) PCT Filed: Jun. 26, 2014

(86) PCT No.: PCT/JP2014/067078
§ 371 (c)(1),
(2) Date: Dec. 21, 2015

(87) PCT Pub. No.: WO2015/005133
PCT Pub. Date: Jan. 15, 2015

(65) Prior Publication Data
US 2016/0150296 A1  May 26, 2016

(30) Foreign Application Priority Data

Jul. 10, 2013 (JP) ................................ 2013-144087

(51) Int. Cl.
*H04N 21/8352* (2011.01)
*H04N 21/81* (2011.01)
(Continued)

(52) U.S. Cl.
CPC ......... *H04N 21/8352* (2013.01); *G06F 21/10* (2013.01); *G06F 21/51* (2013.01);
(Continued)

(58) Field of Classification Search
CPC combination set(s) only.
See application file for complete search history.

(56) References Cited

U.S. PATENT DOCUMENTS

| 8,132,202 B2 * | 3/2012 | Swix ..................... G06Q 30/02 725/14 |
| 8,589,691 B1 * | 11/2013 | Hackborn ............. H04L 9/3263 713/176 |

(Continued)

FOREIGN PATENT DOCUMENTS

| CN | 1467623 A | 1/2004 |
| CN | 1628447 A | 6/2005 |

(Continued)

OTHER PUBLICATIONS

Extended European Search Report dated Jan. 24, 2017 in Patent Application No. 14822193.0.

(Continued)

*Primary Examiner* — Alexander Gee
(74) *Attorney, Agent, or Firm* — Oblon, McClelland, Maier & Neustadt, L.L.P.

(57) ABSTRACT

The present technology relates to a reception device, a reception method, and a transmission method enabling more flexible application usage. An application acquisition unit acquires an application that operates together with AV content, and an application control unit controls operation of the application according to a verification result of whether or not the application is trustworthy. Consequently, an application of assured trust may be made to operate, enabling more flexible application usage. The present technology may be applied to a television set, for example.

18 Claims, 18 Drawing Sheets

(51) Int. Cl.

| | |
|---|---|
| *H04N 21/454* | (2011.01) |
| *H04N 21/462* | (2011.01) |
| *H04N 21/4782* | (2011.01) |
| *H04N 21/488* | (2011.01) |
| *H04N 21/61* | (2011.01) |
| *H04N 21/2665* | (2011.01) |
| *H04N 21/44* | (2011.01) |
| *G06F 21/51* | (2013.01) |
| *G06F 21/10* | (2013.01) |
| *H04L 9/32* | (2006.01) |

(52) U.S. Cl.
CPC .......... *H04L 9/3247* (2013.01); *H04L 9/3263* (2013.01); *H04N 21/2665* (2013.01); *H04N 21/44008* (2013.01); *H04N 21/454* (2013.01); *H04N 21/4622* (2013.01); *H04N 21/4782* (2013.01); *H04N 21/488* (2013.01); *H04N 21/6125* (2013.01); *H04N 21/8126* (2013.01); *H04N 21/8173* (2013.01); *H04L 2209/60* (2013.01)

(56) References Cited

U.S. PATENT DOCUMENTS

| | | | | |
|---|---|---|---|---|
| 2003/0009769 | A1 | 1/2003 | Hensgen et al. | |
| 2005/0013440 | A1* | 1/2005 | Akiyama | H04H 60/16 380/277 |
| 2005/0015815 | A1* | 1/2005 | Shoff | H04N 5/44543 725/135 |
| 2005/0055728 | A1* | 3/2005 | Gardes | H04N 21/4345 725/109 |
| 2007/0234395 | A1* | 10/2007 | Dureau | H04N 5/4401 725/135 |
| 2007/0234422 | A1* | 10/2007 | Piesing | H04N 21/2541 726/19 |
| 2008/0109549 | A1* | 5/2008 | Nakagawa | G06F 21/10 709/225 |
| 2009/0070540 | A1* | 3/2009 | Dewa | H04H 60/73 711/163 |
| 2009/0179775 | A1* | 7/2009 | Bos | G08G 1/0962 340/905 |
| 2011/0087881 | A1 | 4/2011 | Howcroft et al. | |
| 2012/0297473 | A1* | 11/2012 | Case | H04L 63/0823 726/10 |
| 2013/0061042 | A1 | 3/2013 | Howcroft et al. | |

FOREIGN PATENT DOCUMENTS

| | | |
|---|---|---|
| CN | 1973269 A | 5/2007 |
| JP | 2008-500628 A | 1/2008 |
| JP | 2012-156712 A | 8/2012 |
| JP | 2013-98781 A | 5/2013 |
| JP | 2013-162445 A | 8/2013 |
| WO | 2012/157755 A1 | 11/2012 |
| WO | 2013/094110 A1 | 6/2013 |

OTHER PUBLICATIONS

Search Report and Written Opinion for SG Patent Application No. 11201510809R, dated Aug. 10, 2016, 10 pages.

Takechi Masaru, "Technologies Supporting Hybridcast®", Broadcast Technology No. 51, Mar. 4, 2013, pp. 09-15.

Baba, et al., "Seamless, Synchronous, and Supportive: Welcome to Hybridcast: An Advanced Hybrid Broadcast and Broadband System", IEEE Consumer Electronics Magazine, vol. 1, Issue 2, Apr. 2012, pp. 43-52.

Japanese Office Action dated Jul. 26, 2018 in Japanese Patent Application No. 2015-526250 (with English translation), citing documents AO, AP, AX and AY therein, 16 pages.

Takechi, M., Technologies Supporting Hybridcast®, Broadcast Technology, Retrieved from the internet: URL: http://www.nhk.or.ip/strl/publica/bt/en/fe0051-3.pdf , No. 51, Winter 2013, pp. 9-15.

"Trends in Standardization of Hybrid Television Hybridcast: Realizing a New Integrated Broadcast-Broadband Service", The Journal of the Institute of Image Information and Television Engineers, vol. 67 No. 5, 2013, p. 355 to 360.

Combined Office Action and Search Report dated Apr. 16, 2018 in Chinese Patent Application No. 201480037873.8 (with English language translation) citing references AO-AQ therein, 18 pages.

\* cited by examiner

RECEPTION DEVICE, RECEPTION METHOD, AND TRANSMISSION METHOD

TECHNICAL FIELD

The present technology relates to a reception device, a reception method, and a transmission method, and more particularly, to a reception device, a reception method, and a transmission method enabling more flexible application usage.

BACKGROUND ART

With the advent of digital broadcasting, data broadcasting has also started in Japan, resulting in an environment that provides application services which operate together with television programs (for example, see Patent Literature 1). Meanwhile, in Europe, data broadcasting services such as Hybrid Broadcast Broadband TV (HbbTV) have started, and an environment similar to Japan is in place (for example, see Patent Literature 2).

Herein, an application refers to a computer program written in a language such as HyperText Markup Language (HTML) or Java (registered trademark). Unlike an application that runs on a personal computer or the like, the application herein is able to change behavior in synchronization with signals transmitted by being included in a broadcast wave.

Additionally, the application itself is transmitted by broadcast wave, or acquired by accessing a server on the Internet according to Uniform Resource Locator (URL) information transmitted by being included in a broadcast wave.

Meanwhile, since the Internet is constructed as a basically open environment, there is also a possibility of being provided with malicious applications that change the channel without permission, steal user information, or the like, for example. Accordingly, there is adopted a method that defines different security levels, and restricts the functions of applications not satisfying certain standards.

For example, in the case of data broadcasting in Japan, a state enabling all functions of the receiver is only available on one level of a server domain specified within an application transmitted by broadcast wave, and if the receiver moves to a different domain, the functions cannot be used. In addition, the introduction of hybrid cast services in Japan is now being investigated. With such a service, trusted domains are acquired from information associated with a broadcast wave and managed as a list, and if the receiver is on such a domain, the functions of the receiver become usable.

Also, in the case of HbbTV in Europe, the functions of the receiver only become usable within the scope of an application launched from a signal transmitted by being included in a broadcast wave.

CITATION LIST

Patent Literature

Patent Literature 1: JP 2012-156712 A
Patent Literature 2: JP 2013-98781 A

SUMMARY OF INVENTION

Technical Problem

However, with the technology of the related art discussed above, although the trustworthiness of an application that operates together with a television broadcast is ensured by direct association of some kind in the broadcast wave, such a method of ensuring trust means that if an application is not directly associated with the broadcast wave, the application is unable to use the functions of the receiver.

For this reason, applications of the related art may only be operated and managed in a limited manner, and there is demand to provide applications enabling more flexible usage.

The present technology has been devised in light of such circumstances, and enables more flexible application usage by imparting trustworthiness to an application that operates together with a television program, without directly associating the application with a broadcast wave.

Solution to Problem

A reception device according to a first aspect of the present technology includes: a content reception unit configured to receive AV content; an application acquisition unit configured to acquire an application that operates together with the AV content; and an application control unit configured to control operation of the application according to a verification result of whether or not the application is trustworthy.

The AV content is broadcast content transmitted by a broadcast wave. The reception device further includes an electronic certificate acquisition unit configured to acquire an electronic certificate, transmitted by the broadcast wave, for verifying an electronic signature attached to the application, and an electronic signature verification unit configured to use the electronic certificate to verify the electronic signature attached to the application.

The application control unit launches and executes the application only when the application is trustworthy.

The electronic certificate is a certificate shared in common with respective channels.

The electronic certificate is a different certificate for each channel.

An electronic program guide transmitted by the broadcast wave associates an identifier of the electronic certificate with each channel. The electronic certificate acquisition unit acquires, on a basis of the electronic program guide, the electronic certificate from a broadcast wave of a channel corresponding to the identifier of the electronic certificate obtained from the electronic signature attached to the application.

The electronic certificate is shared with another electronic device on a same network.

The application acquisition unit acquires the application from a designated server via a network.

The reception device may be an independent device, or an internal block constituting part of a single device.

A reception method according to the first aspect of the present technology is a reception method corresponding to the reception device according to the first aspect of the present technology.

In the reception device and the reception method according to the first aspect of the present technology, AV content is received, an application that operates together with the AV content is acquired, and operation of the application is controlled according to a verification result of whether or not the application is trustworthy.

A transmission method according to a second aspect of the present technology includes the steps of: acquiring an electronic certificate for verifying an electronic signature attached to an application that operates together with AV content; transmitting the electronic certificate together with the AV content; acquiring the application with the electronic signature attached; and transmitting the application.

The AV content is broadcast content transmitted by a broadcast wave. The electronic certificate is transmitted by the broadcast wave together with the broadcast content.

The application is transmitted via a network in response to a request from a receiver.

In a transmission method according to a second aspect of the present technology, an electronic certificate for verifying an electronic signature attached to an application that operates together with AV content is acquired, the electronic certificate is transmitted together with the AV content, the application with an attached electronic signature is acquired, and the application is transmitted.

Advantageous Effects of Invention

According to the first aspect and the second aspect of the present technology, more flexible application usage may be conducted.

DESCRIPTION OF EMBODIMENTS

Figure 1:
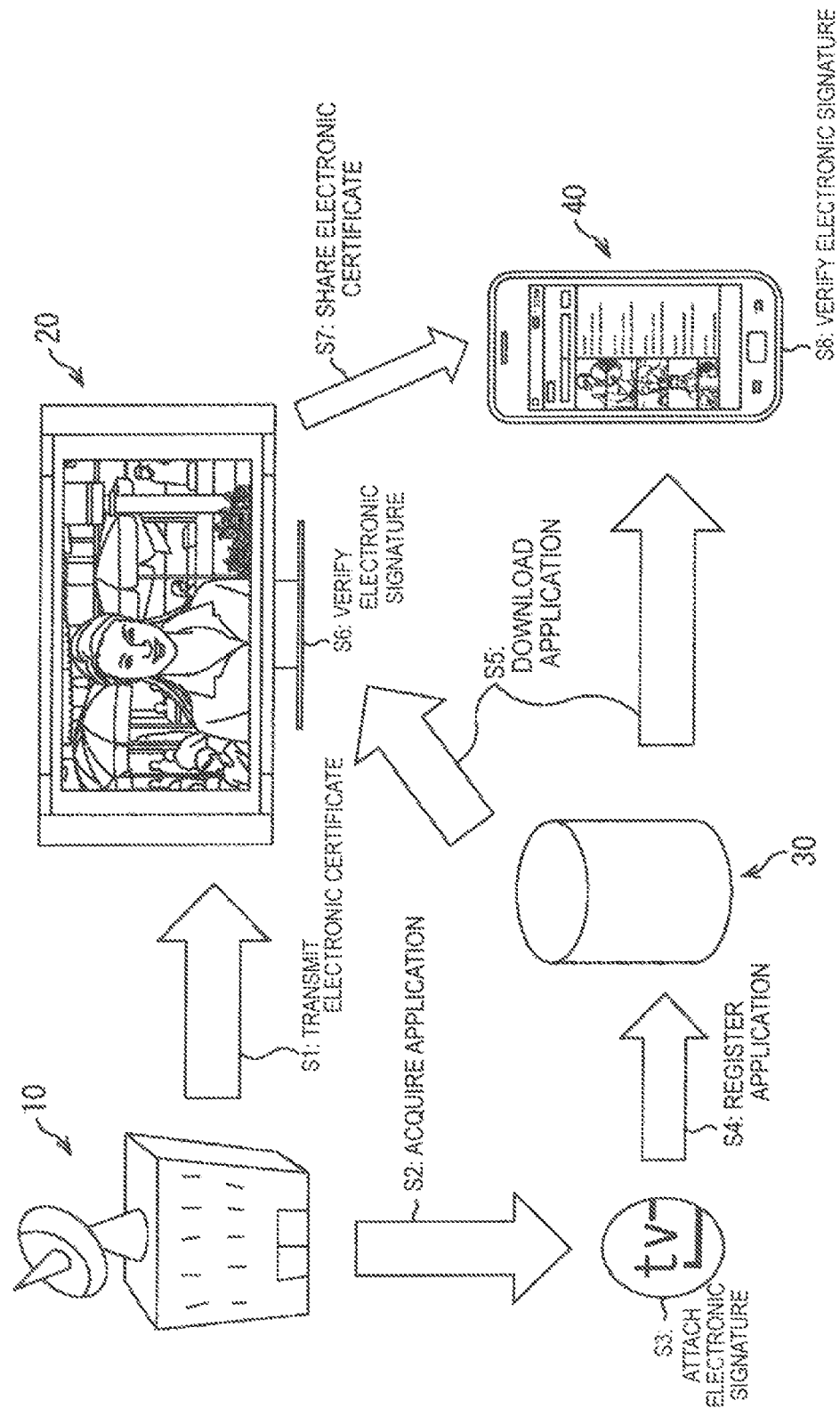
FIG. 1 is a diagram illustrating an overview of the present technology.

Hereinafter, an embodiment of the present technology will be described with reference to the drawings.
<Overview of Present Technology>
FIG. 1 is a diagram illustrating an overview of the present technology.

As illustrated in FIG. 1, a transmission device 10 transmits an electronic certificate together with broadcast content by broadcast wave (S1). The electronic certificate is a certificate for verifying an electronic signature attached to an application acquired by a reception device 20. Also, the application operates together with the broadcast content, and is created by and acquired from a so-called third party the broadcasting organization, or the like (S2). Additionally, an electronic signature is attached to the application by the broadcasting organization, thereby proving that the application is trustworthy (S3).

The application with an attached electronic signature is registered in an application server 30, and made available for download over the Internet (S4). Note that, although not illustrated in FIG. 1, applications without an electronic signature attached by the broadcasting organization are also available for download from other application servers.

The reception device 20 is a television receiver, for example, and enables broadcast content from the transmission device 10 to be viewed. In addition, the reception device 20 receives and stores the electronic certificate from the transmission device 10. The reception device 20 is able to access the application server 30 and download the application at an arbitrary timing in response to a user operation (S5). The downloaded application is stored in the reception device 20.

Figure 2:
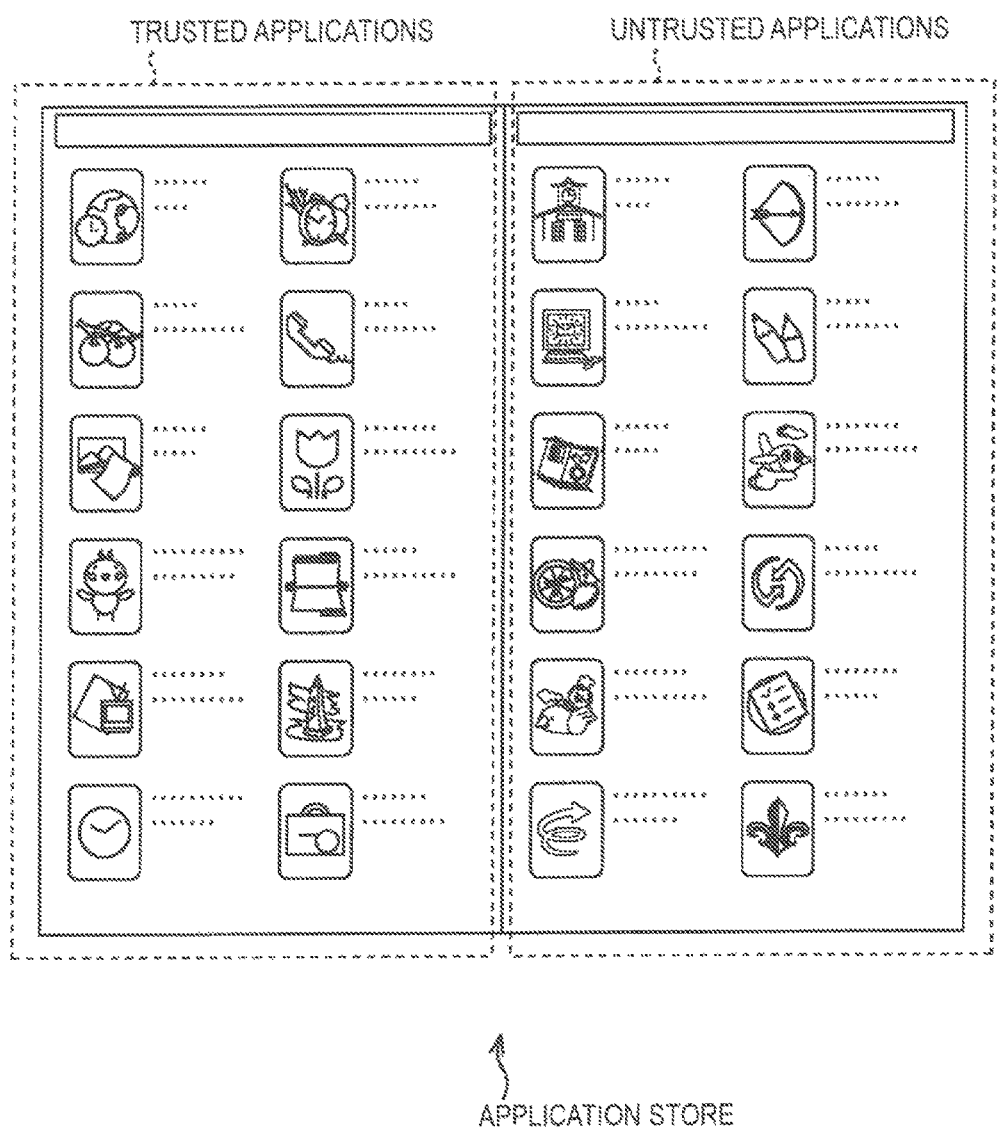
FIG. 2 is a diagram illustrating an example of an application provision method.

At this point, for example, multiple applications created by a third party, the broadcasting organization, or the like may also be provided collected together by an application store. In other words, for example, by having the reception device 20 access a server that provides the application store on the Internet, an application list provided by the application store is presented, as illustrated in FIG. 2. Consequently, the user is able to select a desired application from the application list. Subsequently, the reception device 20 downloads the application selected by the user from the application store server or the like.

However, in the example of the application list in FIG. 2, applications are classified and displayed as trusted applications and untrusted applications. In the following description, an application with an attached electronic signature authorized by the broadcasting organization will be designated a "trusted application", whereas an application without an attached electronic signature authorized by the broadcasting organization will be designated an "untrusted application". Also, trusted applications and untrusted applications simply will be designated "applications" when it is not necessary to distinguish between them.

In other words, in the application store of FIG. 2, the user is able to select, and download to the reception device 20, either a trusted application created by the broadcasting organization or by a third party authorized by the broadcasting organization, or an untrusted application created by a third party not authorized by the broadcasting organization.

Returning to the description of FIG. 1, in the reception device 20, an electronic signature verification process is conducted when an instruction to launch a downloaded application is given (S6). In other words, the electronic certificate for the currently selected channel (broadcasting organization) and the electronic signature attached to the application are used to verify whether or not the application specified for launch may be operated together with the broadcast content of the currently selected channel. Subsequently, if the application specified for launch is a trustworthy application authorized by the broadcasting organization, the application is treated as a trusted application, and execution continues. On the other hand, if the application specified for launch is a untrustworthy application not authorized by the broadcasting organization, the application may be treated as an untrusted application and aborted, for example.

Figure 3:
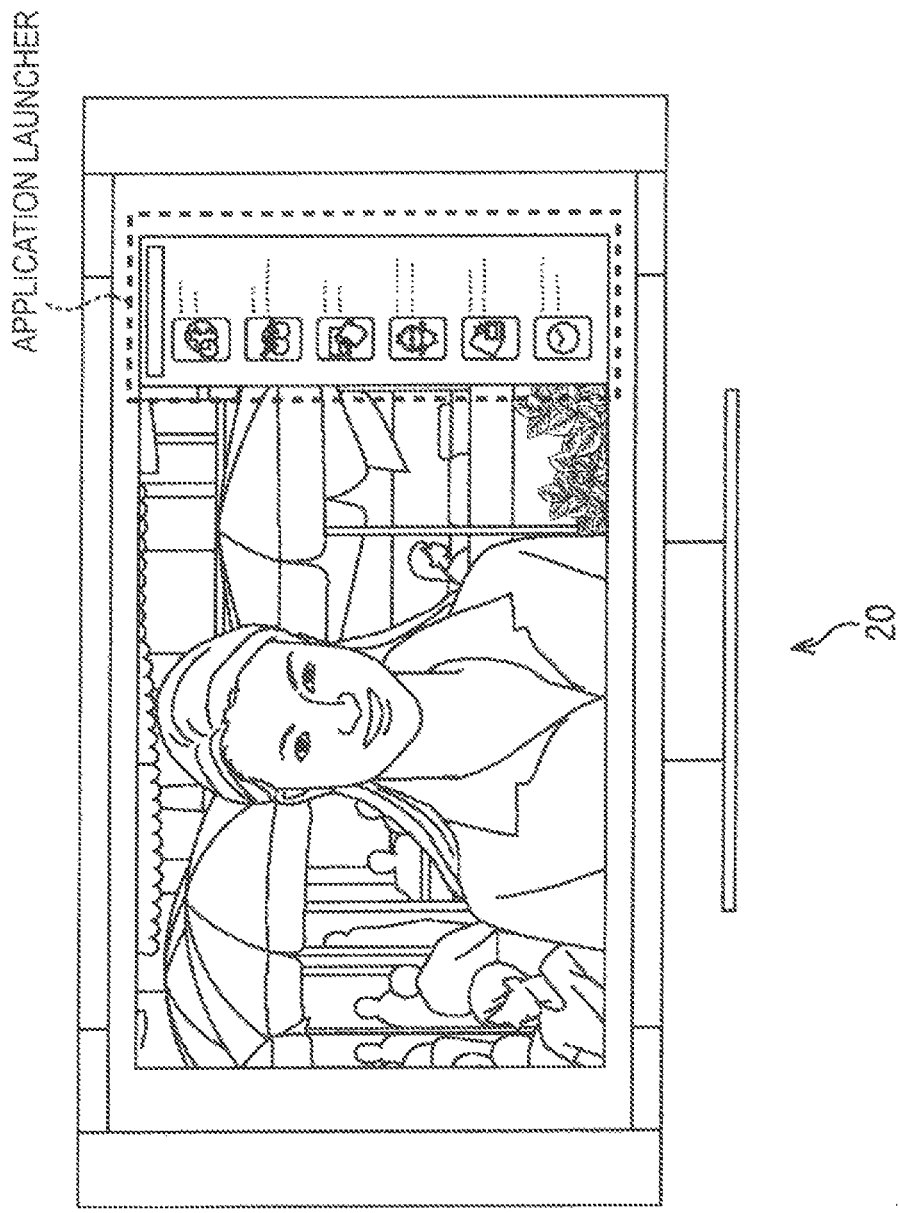
FIG. 3 is a diagram illustrating an example of a trusted application launching method.

Note that in an electronic signature verification process, for example, a signature information element is serialized by a normalization scheme designated by a normalization algorithm, key information or the like is used to acquire key data, and a scheme designated by the signature algorithm is used to verify the signature. However, an electronic certificate includes a public key required for electronic signature verification. Also, regarding the method of launching applications in the reception device 20, an application may be launched from an application launcher or the like displayed in a designated region of the screen together with a television program, as illustrated in FIG. 3, for example. Note that in the application launcher it is also possible to display only trusted applications, and not display untrusted applications.

Figure 4:
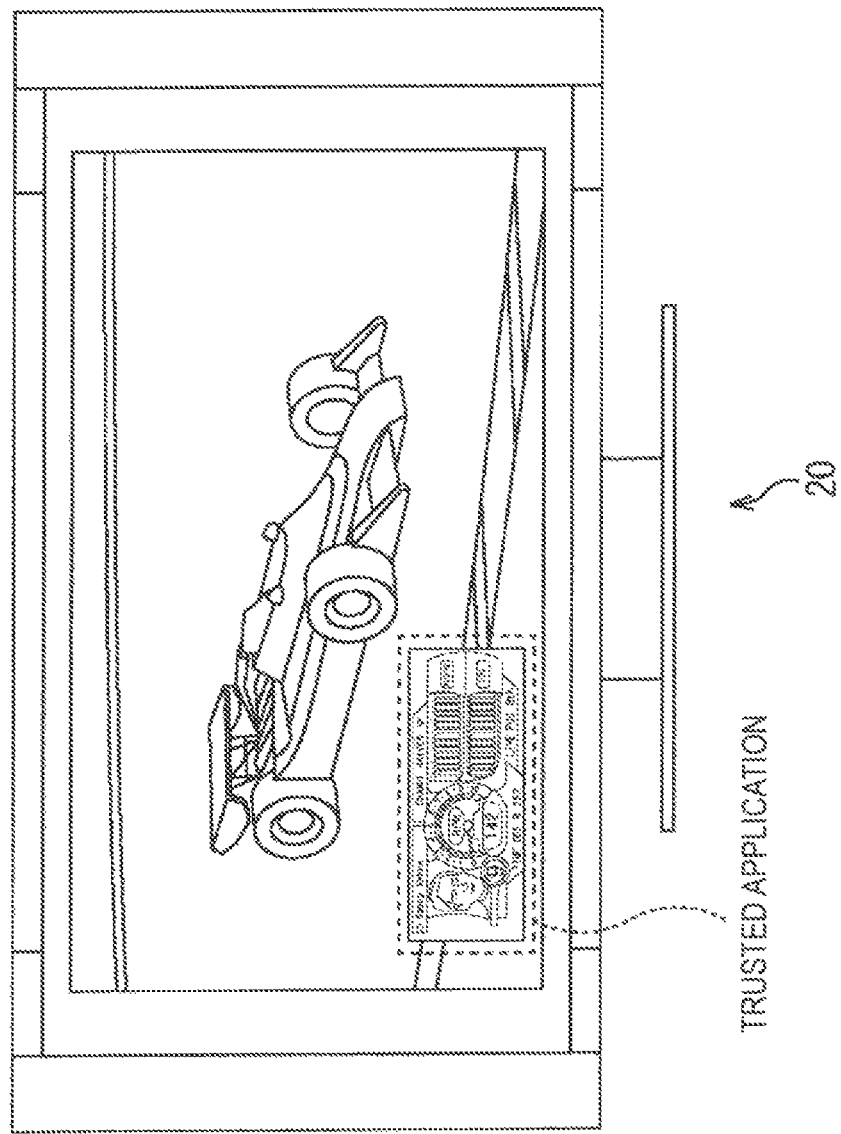
FIG. 4 is a diagram illustrating a display example of a trusted application that operates together with a television program.

Additionally, when an instruction to launch a trusted application is given on the reception device 20, the trusted application is executed together with a television program, as illustrated in FIG. 4, for example. In this example, information related to a driver registered by the user in advance is displayed superimposed onto an auto racing program as the trusted application.

Returning to the description of FIG. 1, the reception device 20 is able to share an electronic certificate with a terminal device 40 connected via a home network (S7). Herein, the terminal device 40 is a smartphone, a mobile phone, or a tablet-style mobile terminal, for example, and includes a communication function. The reception device 20 conducts device authentication with the terminal device 40, and if authentication is successful, transmits an already-acquired electronic certificate to the terminal device 40. Consequently, an electronic certificate is shared between the reception device 20 and the terminal device 40. In the terminal device 40, an application is downloaded (S5), and when launching the application, an electronic signature verification process using the shared electronic certificate is conducted (S8). Subsequently, the terminal device 40 executes the application depending on the process result of the electronic signature verification process.

As above, in the present technology, since trustworthiness may be imparted to an application that operates together with a television program, without directly associating the application with a broadcast wave, more flexible application usage becomes possible.

In other words, in the related art, an application cannot be executed inside the receiver unless a signal transmitted by being included in a broadcast wave is used directly. However, in the present technology, trustworthiness is imparted to an application without directly associating the application with a signal transmitted by being included in the broadcast wave, or in other words, by indirect association, thereby making possible usage, such as the execution of only trusted applications, for example. As another example, even if an application is installed in advance, it becomes possible to execute the application depending on the verification result of the application's trustworthiness. In addition, even if an application is provided independently by a third party, by attaching an electronic signature authorized by the broadcasting organization, the application may be provided as a trusted application, thereby broadening the range of application usage.

<Configuration of Integrated Broadcast-Broadband System>

Figure 5:
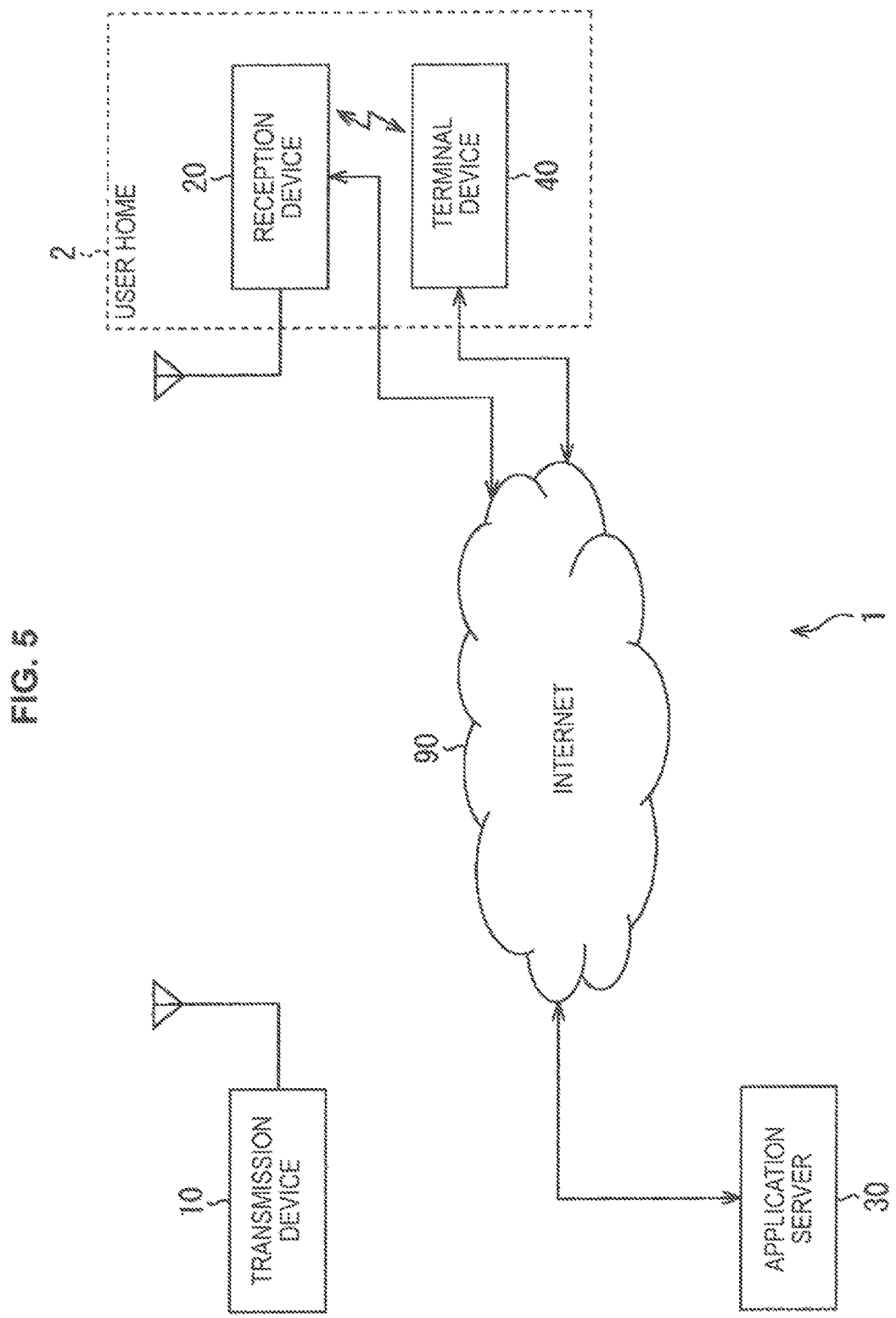
FIG. 5 is a block diagram illustrating an embodiment of an integrated broadcast-broadband system applying the present technology.

FIG. 5 is a block diagram illustrating an embodiment of an integrated broadcast-broadband system applying the present technology. As illustrated in FIG. 5, the integrated broadcast-broadband system 1 is made up of the transmission device 10, the reception device 20, the application server 30, and the terminal device 40. Also, in FIG. 5, the application server 30, the reception device 20, and the terminal device 40 are interconnected via the Internet 90. Furthermore, the reception device 20 and the terminal device 40 are connected over a home network inside a user home 2.

The transmission device 10 transmits broadcast content, such as television programs, via digital broadcast signals. Additionally, the transmission device 10 transmits an electronic certificate for verifying an electronic signature attached to an application by including the electronic certificate in a broadcast signal.

The reception device 20 is a receiver such as a television set. The reception device 20 receives a broadcast signal from the transmission device 10, displays a picture of the broadcast content on a display, and outputs audio corresponding to the picture from one or more speakers. In addition, the reception device 20 receives and stores the electronic certificate from the transmission device 10.

The application server 30 is a server that provides applications. The application server 30, in response to a request from the reception device 20, provides an application to the reception device 20 via the Internet 90. However, applications provided by the application server 30 include those with an attached electronic signature from the broadcasting organization, and those without an attached electronic signature. Note that, as illustrated in FIG. 2, applications may be provided via an application store, or provided directly from the application server 30.

The reception device 20 acquires an application provided by the application server 30. The reception device 20 uses the stored electronic certificate to conduct an electronic signature verification process on the application, and if the relevant application is trustworthy, executes the relevant application as a trusted application.

The terminal device 40 is an information terminal such as a smartphone, for example, and includes a communication function. The terminal device 40, by connecting to the reception device 20 via the home network inside the user home 2, is able to receive and share an electronic certificate transmitted from the reception device 20.

In addition, the terminal device 40 acquires an application provided by the application server 30. The terminal device 40 uses the electronic certificate shared with the reception device 20 to conduct an electronic signature verification process on the application, and if the relevant application is trustworthy, executes the relevant application as a trusted application.

Note that FIG. 5 illustrates only one reception device 20 for the sake of simplicity, but in practice, the integrated broadcast-broadband system 1 includes multiple reception devices 20, and each reception device 20 receives broadcast content from the transmission device 10. Also, the application server 30 may be multiply provided for each provided application.

The integrated broadcast-broadband system 1 is configured as above.

<Exemplary Configuration of Each Device>

Next, an exemplary configuration of each device constituting the integrated broadcast-broadband system 1 of FIG. 5 will be described with reference to the block diagram diagrams in FIGS. 6 to 9.

(Exemplary Configuration of Transmission Device)

Figure 6:
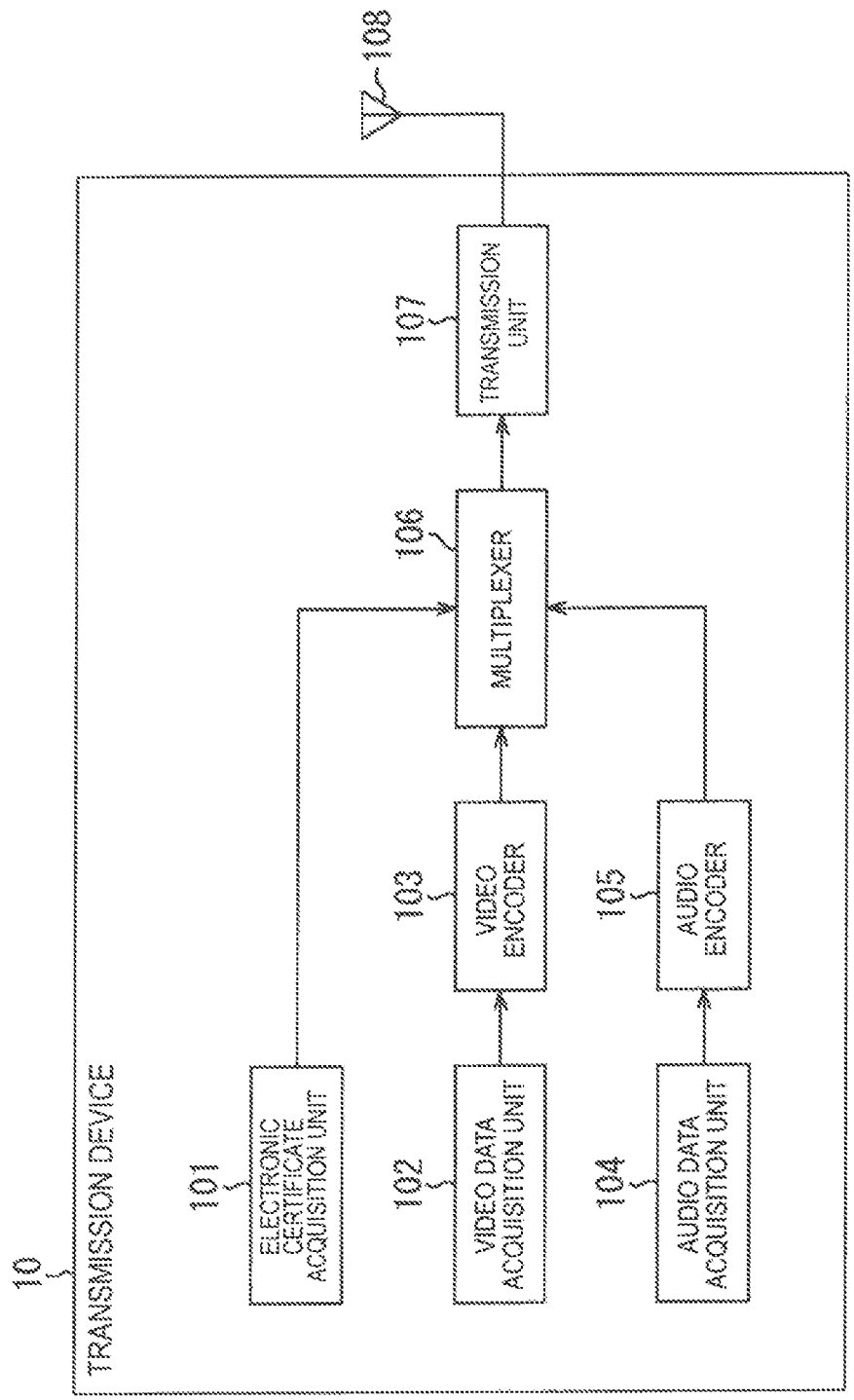
FIG. 6 is a block diagram illustrating an embodiment of a transmission device applying the present technology.

FIG. 6 is a block diagram illustrating a detailed exemplary configuration of the transmission device 10 in FIG. 5. In FIG. 6, the transmission device 10 is made up of an electronic certificate acquisition unit 101, a video data acquisition unit 102, a video encoder 103, an audio data acquisition unit 104, an audio encoder 105, a multiplexer 106, a transmission unit 107, and an antenna 108.

The electronic certificate acquisition unit 101 acquires an electronic certificate for verifying an electronic signature attached to an application by generating the electronic certificate, and supplies the electronic certificate to the multiplexer 106. In addition, the electronic certificate acquisition unit 101 acquires an electronic certificate ID of the electronic certificate, and includes the electronic certificate ID in an electronic program guide (EPG) in correspondence with a channel. In other words, the electronic program guide includes electronic certificate IDs for each channel.

The video data acquisition unit 102 acquires the video data of a TV program, for example, from a built-in hard disk drive (HDD), an external server, a camera, or the like, and supplies the acquired video data to the video encoder 103. The video encoder 103 encodes the video data supplied from the video data acquisition unit 102 to conform with a coding scheme such as Moving Picture Experts Group (MPEG), and supplies the encoded video data to the multiplexer 106.

The audio data acquisition unit 104 acquires the audio data of a TV program, for example, from a built-in HDD, an external server, a microphone, or the like, and supplies the acquired audio data to the audio encoder 105. The audio encoder 105 encodes the audio data supplied from the audio data acquisition unit 104 to conform with a coding scheme such as MPEG, and supplies the encoded audio data to the multiplexer 106.

The multiplexer 106 multiplexes the video data from the video encoder 103 and the audio data from the audio encoder 105 to generate a transport stream, and supplies the transport stream to the transmission unit 107. However, in the transport stream, various information, such as electronic certificate data from the electronic certificate acquisition unit 101 and electronic program guide data including electronic certificate IDs for each channel, is also multiplexed as appropriate.

The transmission unit 107 transmits the transport stream supplied from the multiplexer 106 as a broadcast signal via the antenna 108.

The transmission device 10 is configured as above.

(Exemplary Configuration of Reception Device)

Figure 7:
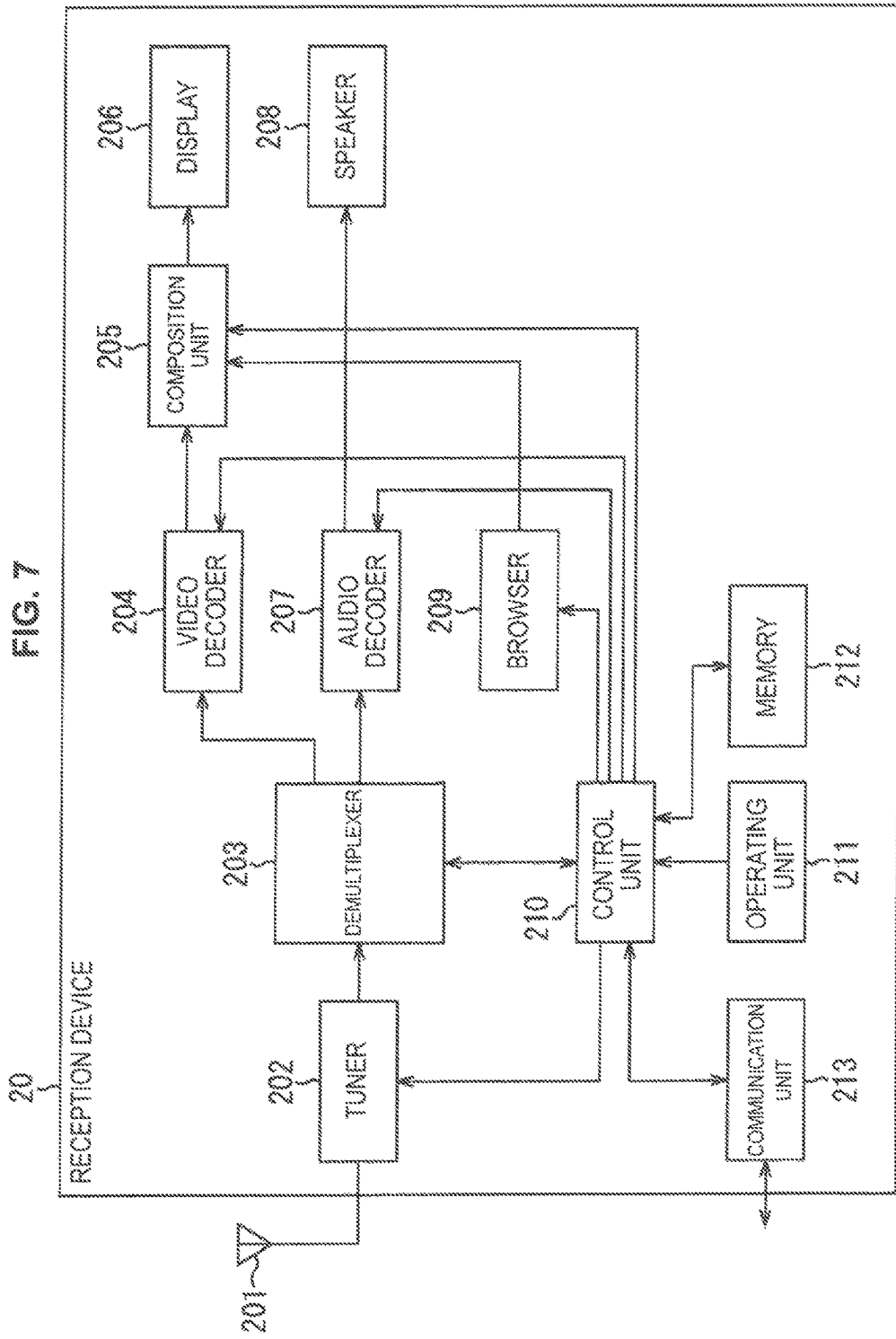
FIG. 7 is a block diagram illustrating an embodiment of a reception device applying the present technology.

FIG. 7 is a block diagram illustrating a detailed exemplary configuration of the reception device 20 in FIG. 5. In FIG. 7, the reception device 20 is made up of an antenna 201, a tuner 202, a demultiplexer 203, a video decoder 204, a composition unit 205, a display 206, an audio decoder 207, a speaker 208, a browser 209, a control unit 210, an operating unit 211, memory 212, and a communication unit 213.

The antenna 201 receives a broadcast signal from the transmission device 10, and supplies the broadcast signal to the tuner 202. The tuner 202, under control by the control unit 210, tunes (demodulates) the broadcast signal of a designated channel from the broadcast signal from the antenna 201, and supplies the transport stream obtained as a result to the demultiplexer 203.

The demultiplexer 203 demultiplexes the transport stream supplied from the tuner 202 into video data, audio data, various information, and the like. The demultiplexer 203 supplies the video data to the video decoder 204, and supplies the audio data to the audio decoder 207. Additionally, the various information is supplied to the control unit 210.

The video decoder 204, under control by the control unit 210, decodes the video data supplied from the demultiplexer 203 with a scheme corresponding to the video encoder 103 (FIG. 6), and supplies the decoded video data to the composition unit 205. The composition unit 205, under control by the control unit 210, composites video data supplied from the video decoder 204 with video data supplied from the browser 209, and supplies the composited video data to the display 206. Additionally, the composition unit 205, under control by the control unit 210, supplies video data of images of an on-screen display (OSD) or the like to the display 206. The display 206 displays a picture of broadcast content and the like on the basis of the video data supplied from the composition unit 205.

The audio decoder 207, under control by the control unit 210, decodes the audio data supplied from the demultiplexer 203 with a scheme corresponding to the audio encoder 105 (FIG. 6), and supplies the decoded audio data to the speaker 208. The speaker 208 outputs audio corresponding to the audio data from the audio decoder 207, or in other words, audio corresponding to the picture of broadcast content displayed on the display 206.

The browser 209, under control by the control unit 210, executes the application. Video data of the application is supplied to the composition unit 205.

The control unit 210 conducts various processes according to operating signals from the operating unit 211 and the like, and controls each block constituting the reception device 20.

In addition, the control unit 210, on the basis of various information supplied from the demultiplexer 203, controls the video decoder 204, the composition unit 205, the audio decoder 207, and the browser 209. Note that a detailed configuration of the control unit 210 will be discussed later with reference to FIG. 8.

The operating unit 211 is operated by the user, and supplies an operating signal corresponding to the operation to the control unit 210. Note that, although not illustrated, an operating signal corresponding to an operation on a remote control by the user is supplied to the control unit 210 by a light receiving unit. The memory 212, under control by the control unit 210, stores (holds) various information. The communication unit 213, under control by the control unit 210, communicates with equipment connected to various networks, such as the Internet 90 and the home network inside the user home 2.

The reception device 20 is configured as above.

(Exemplary Functional Configuration of Control Unit)

Figure 8:
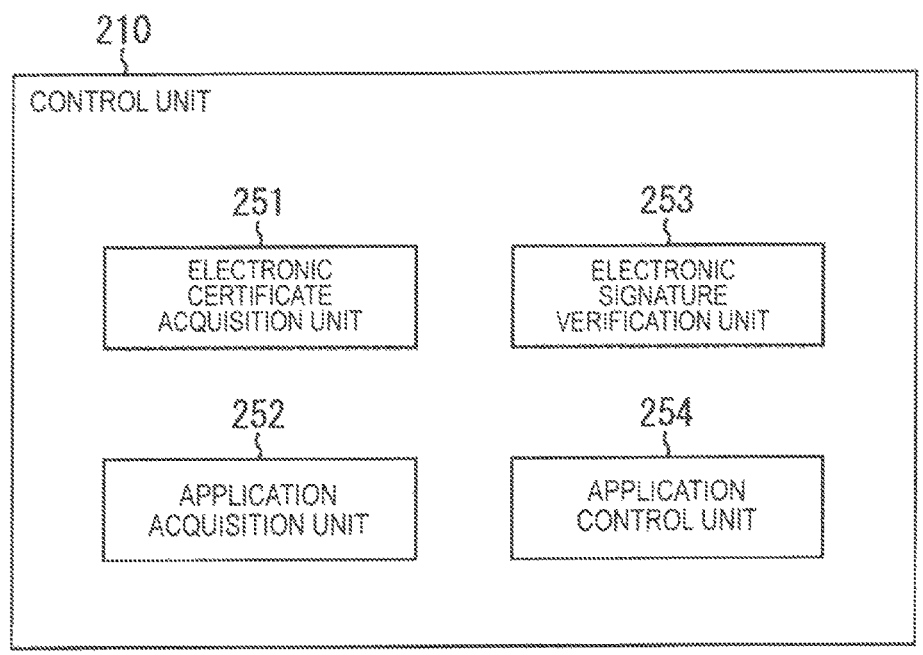
FIG. 8 is a block diagram illustrating an exemplary detailed configuration of a control unit.

FIG. 8 is a block diagram illustrating an exemplary functional configuration of the part of the control unit 210 in FIG. 7 that conducts application-related processing. In FIG. 8, the control unit 210 includes an electronic certificate acquisition unit 251, an application acquisition unit 252, an electronic signature verification unit 253, and an application control unit 254.

The electronic certificate acquisition unit 251 acquires electronic certificate data demultiplexed by the demultiplexer 203, and causes the memory 212 to store the electronic certificate data.

The application acquisition unit 252 controls the communication unit 213 to access the application server 30 via the Internet 90, and acquire an application. The application acquisition unit 252 causes the memory 212 to store the acquired application.

The electronic signature verification unit 253 uses the electronic certificate stored in the memory 212 to conducts a verification process of whether or not the electronic signature attached to the application is trustworthy. The electronic signature verification unit 253 supplies the result of the electronic signature verification process to the application control unit 254.

The application control unit 254, following the result of the electronic signature verification process from the electronic signature verification unit 253, controls the browser 209 to control the operation of the application.

The control unit 210 is configured as above.

(Exemplary Configuration of Application Server)

Figure 9:
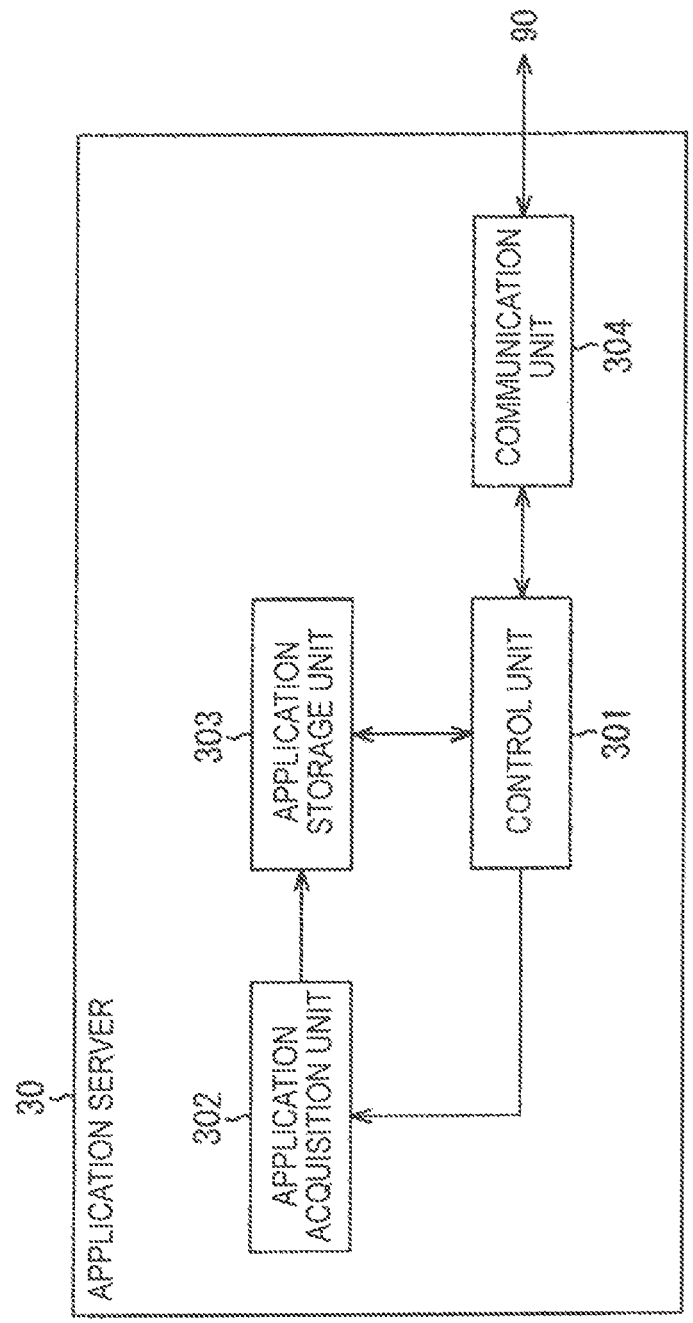
FIG. 9 is a block diagram illustrating an exemplary detailed configuration of an application server.

FIG. 9 is a block diagram illustrating an exemplary detailed configuration of the application server 30 in FIG. 5. In FIG. 9, the application server 30 is made up of a control unit 301, an application acquisition unit 302, an application storage unit 303, and a communication unit 304.

The control unit 301 controls the operation of each unit of the application server 30. The application acquisition unit 302, under control by the control unit 301, acquires and records an application in the application storage unit 303.

The control unit 301 continuously monitors the communication unit 304, and when an application is requested from the reception device 20, the control unit 301 reads out and acquires the application from the application storage unit 303. The communication unit 304, under control by the control unit 301, transmits the application to the reception device 20 via the Internet 90.

The application server 30 is configured as above.

<Content of Specific Processes Conducted by Each Device>

Next, the content of the specific processes conducted by each device constituting the integrated broadcast-broadband system 1 of FIG. 5 will be described with reference to the flowcharts in FIGS. 10 to 17.

(Transmission Process)

Figure 10:
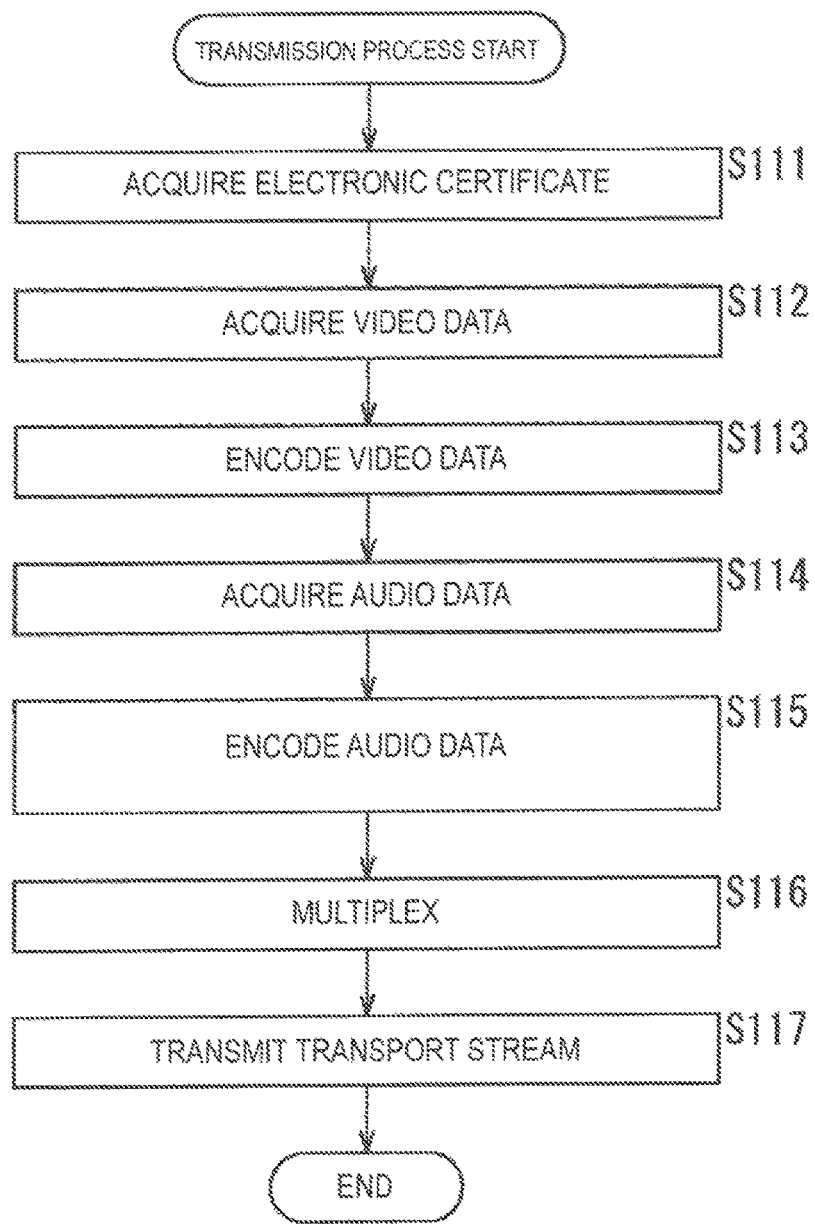
FIG. 10 is a flowchart explaining a transmission process.

First, a transmission process executed by the transmission device 10 of FIG. 5 will be described with reference to the flowchart in FIG. 10.

In step S111, the electronic certificate acquisition unit 101 acquires an electronic certificate for verifying an electronic signature attached to an application by generating the electronic certificate, and supplies the electronic certificate to the multiplexer 106. In addition, the electronic certificate acquisition unit 101 includes an electronic certificate ID in an electronic program guide in correspondence with a channel.

However, the electronic certificate may be a certificate shared in common by respective broadcasting organizations (channels), or a different certificate for each broadcasting organization (channel). For example, in the case of a certificate shared in common by respective channels, an application certified as trustworthy by the certificate may operate together with TV programs on all channels. In this case, the trusted application may provide a service spanning multiple channels. On the other hand, in the case of a different certificate for each channel, an application certified as trustworthy by the certificate may operate only on TV programs on the channel of a specific broadcasting organization.

In step S112, the video data acquisition unit 102 acquires and supplies the video data of a TV program to the video encoder 103, for example. Also, in step S113, the video encoder 103 encodes video data from the video data acquisition unit 102, and supplies the encoded video data to the multiplexer 106.

In step S114, the audio data acquisition unit 104 acquires and supplies the audio data of a TV program to the audio encoder 105, for example. Also, in step S115, the audio encoder 105 encodes audio data from the audio data acquisition unit 104, and supplies the encoded audio data to the multiplexer 106.

In step S116, the multiplexer 106 multiplexes the video data from the video encoder 103 and the audio data from the audio encoder 105 to generate a transport stream. However, in the transport stream, various information, such as electronic certificate data and electronic program guide data including electronic certificate IDs for each channel, is also multiplexed as appropriate.

In step S117, the transmission unit 107 transmits the transport stream supplied from the multiplexer 106 as a broadcast signal via the antenna 108, and the transmission process ends.

The above thus describes the transmission process.

(Reception Process)

Figure 11:
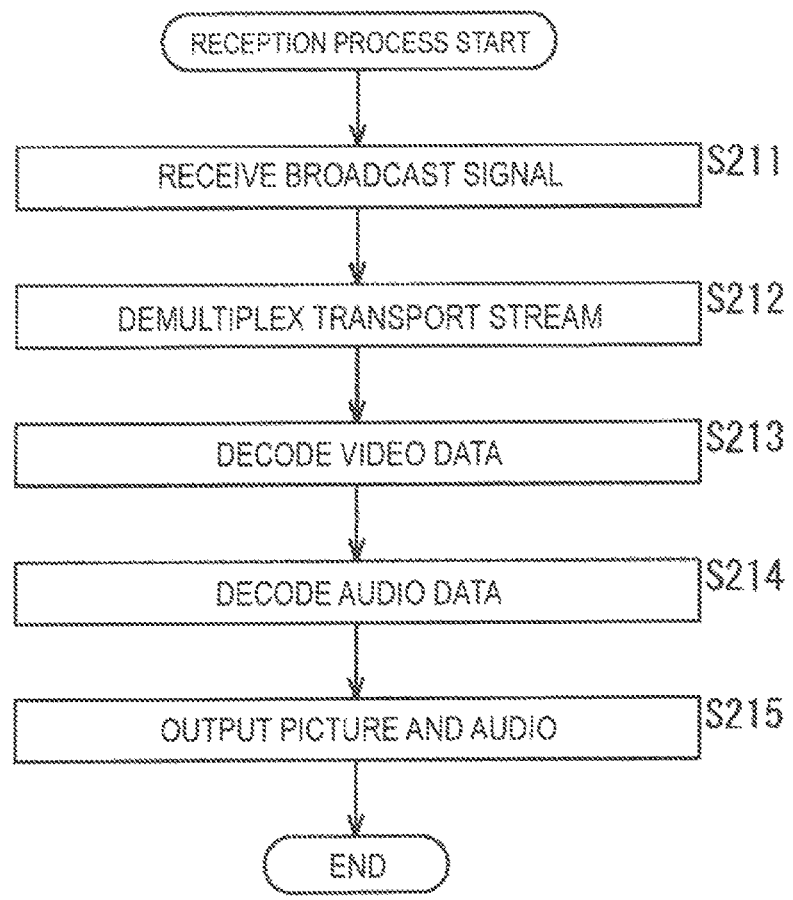
FIG. 11 is a flowchart explaining a reception process.

Next, a reception process executed by the reception device 20 of FIG. 5 will be described with reference to the flowchart in FIG. 11. The reception process is conducted in cases such as when the reception device 20 is activated and tuned to a desired channel according to an operation on the remote control by the user.

In step S211, the tuner 202 receives and demodulates a broadcast signal via the antenna 201. In step S212, the demultiplexer 203 demultiplexes the transport stream demodulated by the tuner 202 into video data, audio data, and the like.

In step S213, the video decoder 204 decodes the video data demultiplexed by the demultiplexer 203. Also, in step S214, the audio decoder 207 decodes the audio data demultiplexed by the demultiplexer 203.

In step S215, the display 206 displays a picture corresponding to the video data from the video decoder 204. Also, the speaker 208 outputs audio corresponding to the audio data from the audio decoder 207. Consequently, the picture of a TV program and audio corresponding to the picture are output, and the user is able to view the desired TV program. After the processing in step S215 finishes, the reception process ends.

The above thus describes the reception process.

(Initialization Process)

Next, an initialization process executed by the control unit 210 of FIG. 7 will be described with reference to the flowchart in FIG. 12. The initialization process is conducted in cases such as when the reception device 20 is activated for the first time at the time of purchase, or when an initialization operation of the reception device 20 is performed, for example. Consequently, the initialization process is not conducted every time an application is acquired, executed, or the like.

In step S231, the control unit 210 resets a variable i for designating a channel. After that, in step S232, the control unit 210 controls the tuner 202 to tune to a channel on a channel list [i].

In step S233, the control unit 210 references the memory 212, and determines whether or not an up-to-date electronic certificate for the selected channel exists in the receiver. In step S233, if an up-to-date electronic certificate for the selected channel is not being stored in the memory 212, the process proceeds to step S234.

In step S234, the electronic certificate acquisition unit 251 acquires and stores electronic certificate data demultiplexed by the demultiplexer 203 in the memory 212. Consequently, an electronic certificate is acquired from the broadcast wave of the selected channel. On the other hand, in step S233, if an up-to-date electronic certificate for the selected channel is being stored in the memory 212, acquiring the electronic certificate again is not necessary, and thus step S234 is skipped.

Subsequently, in step S235, the value is i is incremented, and then in step S236, it is determined whether or not the next channel list [i] exists. In step S236, if the channel list [i] is determined to exist, the process returns to step S232, and the processing thereafter is repeated. Subsequently, in step S236, if the channel list [i] is determined not to exist, the initialization process ends.

Consequently, a scan of the receivable channels in a certain geographical area is conducted, and an electronic certificate is acquired for each channel and stored in the memory 212. However, although electronic certificates are acquired in this way when the electronic certificate differs for each broadcasting organization (channel), but when an electronic certificate shared in common by respective broadcasting organizations (channels) is used, acquiring an electronic certificate for each selected channel is not necessary, and it is sufficient to acquire one shared electronic certificate from a representative channel, for example.

The above thus describes the initialization process.
(Application Acquisition Process)

Figure 13:
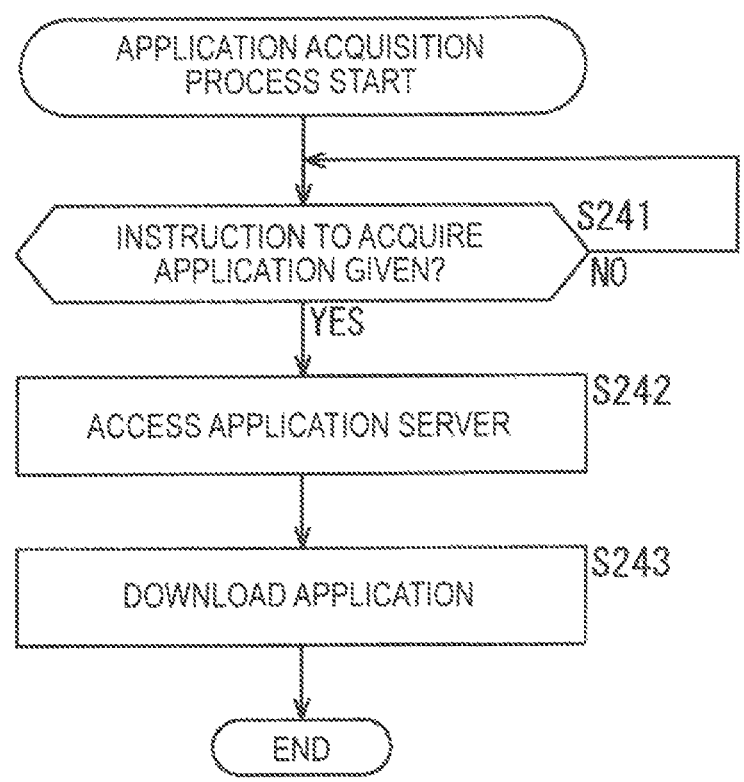
FIG. 13 is a flowchart explaining an application acquisition process.

Next, an application acquisition process executed by the control unit 210 of FIG. 7 will be described with reference to the flowchart in FIG. 13. The application acquisition process is conducted while the user is viewing a TV program by the reception process in FIG. 11, or irrespectively of the viewing of a TV program.

In step S241, the control unit 210 determines whether or not an instruction to acquire an application has been given by an operation or the like on the remote control by the user. In step S241, the process waits until an instruction to acquire an application is given, and then proceeds to step S242.

In step S242, the application acquisition unit 252 controls the communication unit 213 to access the application server 30 via the Internet 90. In step S243, the application acquisition unit 252 controls the communication unit 213 to download an application from the application server 30. The downloaded application is stored in the memory 212.

As another example, if an application is acquired from an application store as illustrated in FIG. 2, the user causes an application list provided by the application store to be displayed, and selects and downloads a desired application from the list.

The above thus describes the application acquisition process.
(Application Control Process)

Figure 14:
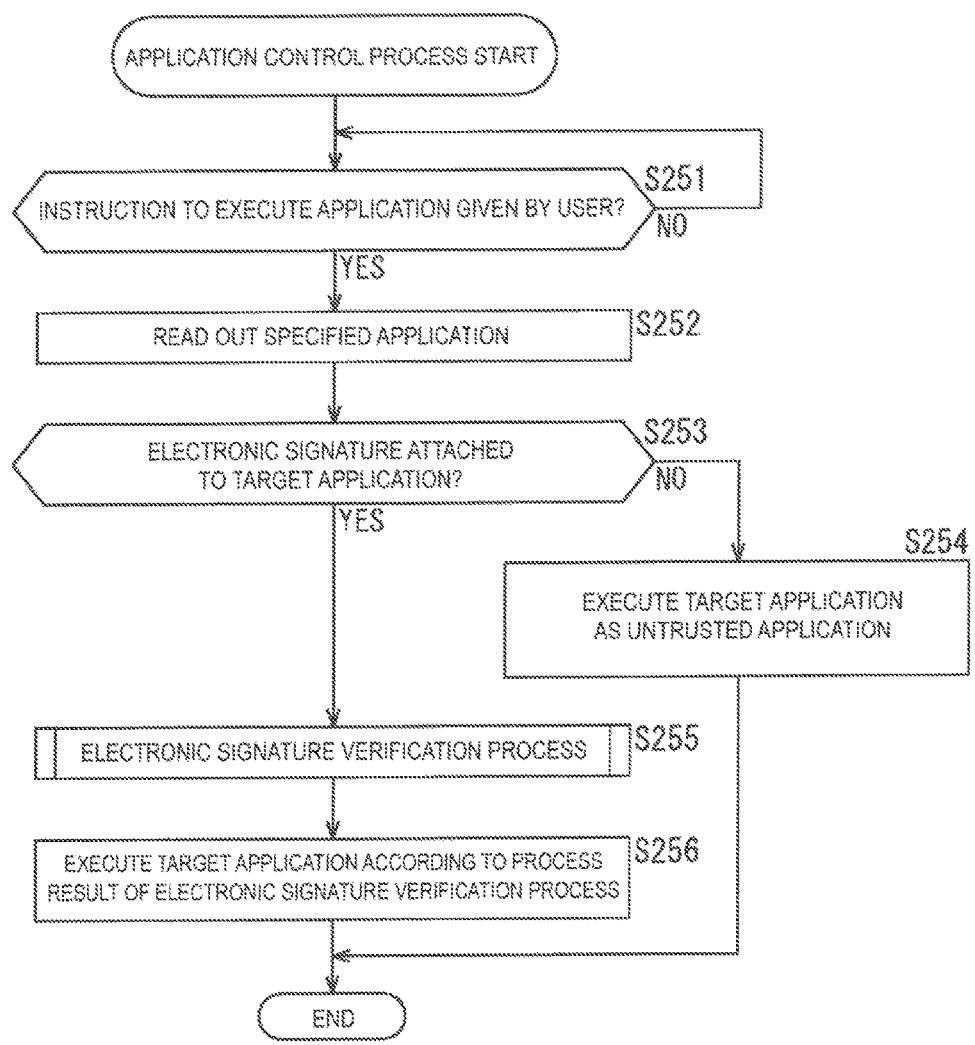
FIG. 14 is a flowchart explaining an application control process.

Next, an application control process executed by the control unit 210 of FIG. 7 will be described with reference to the flowchart in FIG. 14. For example, the application control process is conducted in cases such as when the user is viewing a TV program by the reception process in FIG. 11 after an application is downloaded and stored in the memory 212 by the application reception process in FIG. 13.

In step S251, the control unit 210 determines whether or not an instruction to execute an application has been given by an operation or the like on the remote control by the user. In step S251, the process waits until an instruction to execute an application is given, and then proceeds to step S252. For example, as illustrated in FIG. 3, when an icon displayed in an application launcher is selected, an instruction to execute the application corresponding to the icon is given.

In step S252, the application control unit 254 reads out the application specified for execution from the memory 212. Subsequently, in step S253, the electronic signature verification unit 253 determines whether or not an electronic signature is attached to the target application. In step S252, in the case of determining that an electronic signature is not attached to the target application, the process proceeds to step S254.

In step S254, the application control unit 254 executes the application without an attached electronic signature as an untrusted application. Regarding the treatment of an untrusted application, the available functions may be restricted compared to a trusted application, or the application itself may be aborted without actually being launched.

On the other hand, in step S253, in the case of determining that an electronic signature is attached to the target application, the process proceeds to step S255. In step S255, the electronic signature verification unit 253 conducts the electronic signature verification process. The electronic signature verification process verifies whether or not the electronic signature attached to the target application is trustworthy. Note that the detailed content of the electronic signature verification process will be discussed later with reference to the flowchart in FIG. 15.

After the electronic signature verification process ends, the process proceeds to step S256. In step S256, the application control unit 254 executes the target apparatus in accordance with the process result of the electronic signature verification process in step S255. In other words, if the target application is a trusted application, the application control unit 254 executes the target application without restricting the available functions. For example, a trusted application is able to use functions such as a channel tuning function and the functions of the electronic program guide as resources of the reception device 20. On the other hand, if the target application is an untrusted application, the application control unit 254 restricts the functions available to the target application, or aborts the target application.

The above thus describes the application control process.
(Electronic Signature Verification Process)

Next, the detailed content of the electronic signature verification process corresponding to step S255 of FIG. 14 will be described with reference to the flowchart in FIG. 15.

In step S271, the electronic signature verification unit 253 references the memory 212, and determines whether or not the electronic certificate required by the signature of the target application exists in the receiver. In step S271, in the case of determining that the electronic certificate does not exist in the receiver, the process proceeds to step S272.

In step S272, the electronic certificate acquisition unit 251 conducts an electronic certificate acquisition process. In the electronic certificate acquisition process, the electronic certificate of the target application is acquired from the broadcast wave. Note that the detailed content of the electronic certificate acquisition process will be discussed later with reference to the flowchart in FIG. 16. Additionally, since an electronic certificate for each channel is already acquired by the initialization process of FIG. 12 discussed earlier, the electronic certificate is basically stored in the memory 212, but the electronic certificate acquisition process of step S272 is also conducted in cases such as when the acquisition of an electronic certificate was not conducted during the initialization process for some reason, or when an up-to-date electronic certificate could not be acquired.

Meanwhile, in step S271, in the case of determining that the electronic certificate already exists in the receiver, reacquiring the electronic certificate is not necessary, and thus step S272 is skipped, and the process proceeds to step S273. In step S273, the electronic signature verification unit 253 uses the electronic certificate to verify the electronic signature attached to the target application, and determines whether or not the electronic signature could be verified (S274).

In step S274, if the electronic signature attached to the target application could be verified, or in other words, in the case of determining that verification was successful, the target application is trustworthy, and thus the process proceeds to step S275. In step S275, the electronic signature verification unit 253 treats the target application as a trusted application.

On the other hand, in step S274, if the electronic signature attached to the target application could not be verified, or in other words, in the case of determining that verification failed, the target application is not trustworthy, and thus the process proceeds to step S276. In step S276, the electronic signature verification unit 253 treats the target application as an untrusted application.

The process result of the electronic certificate acquisition process is reported to the application control unit 254. Subsequently, the process returns to step S255 of FIG. 14, and the processing thereafter is executed.

The above thus describes the electronic signature verification process.

(Electronic Certificate Acquisition Process)

Next, the electronic certificate acquisition process corresponding to step S272 of FIG. 15 will be described with reference to the flowchart in FIG. 16.

In step S291, the variable i for designating a channel is set to 0. In step S292, the electronic certificate acquisition unit 251 acquires, from the electronic signature attached to the target application, the electronic certificate ID (=X) of the electronic certificate needed to verify the electronic signature.

In step S293, the electronic certificate acquisition unit 251 acquires the electronic certificate ID[i] included in the electronic program guide, and in step S294, determines whether or not the electronic certificate ID[i]=X. In step S294, in the case of determining that the electronic certificate ID[i]=X, the channel on which the electronic certificate needed to verify the electronic signature may be acquired is specified, and thus the process proceeds to step S295.

In step S295, the control unit 210 controls the tuner 202 to tune to a channel corresponding to the electronic certificate ID[i]. Subsequently, in step S296, the electronic certificate acquisition unit 251 acquires an electronic certificate from the broadcast wave of the selected channel. Consequently, the electronic certificate needed to verify the electronic signature attached to the target application is acquired.

Additionally, in step S294, in the case of determining that the electronic certificate ID[i] does not equal X, the process proceeds to step S297. In step S297, the value of i is incremented, and in step S298, it is determined whether or not the next electronic certificate ID[i] exists in the electronic program guide. In step S298, in the case of determining that the electronic certificate ID[i] exists, the process returns to step S293, the processing thereafter is repeated, and when the electronic certificate ID[i]=X, the electronic certificate is acquired from the broadcast wave of the designated channel.

Subsequently, when an electronic certificate is acquired in step S296, or in the case of determining that the next electronic certificate ID[i] does not exist in the electronic program guide in step S298, the process returns to step S272 of FIG. 15, and the processing thereafter is executed.

Figure 12:
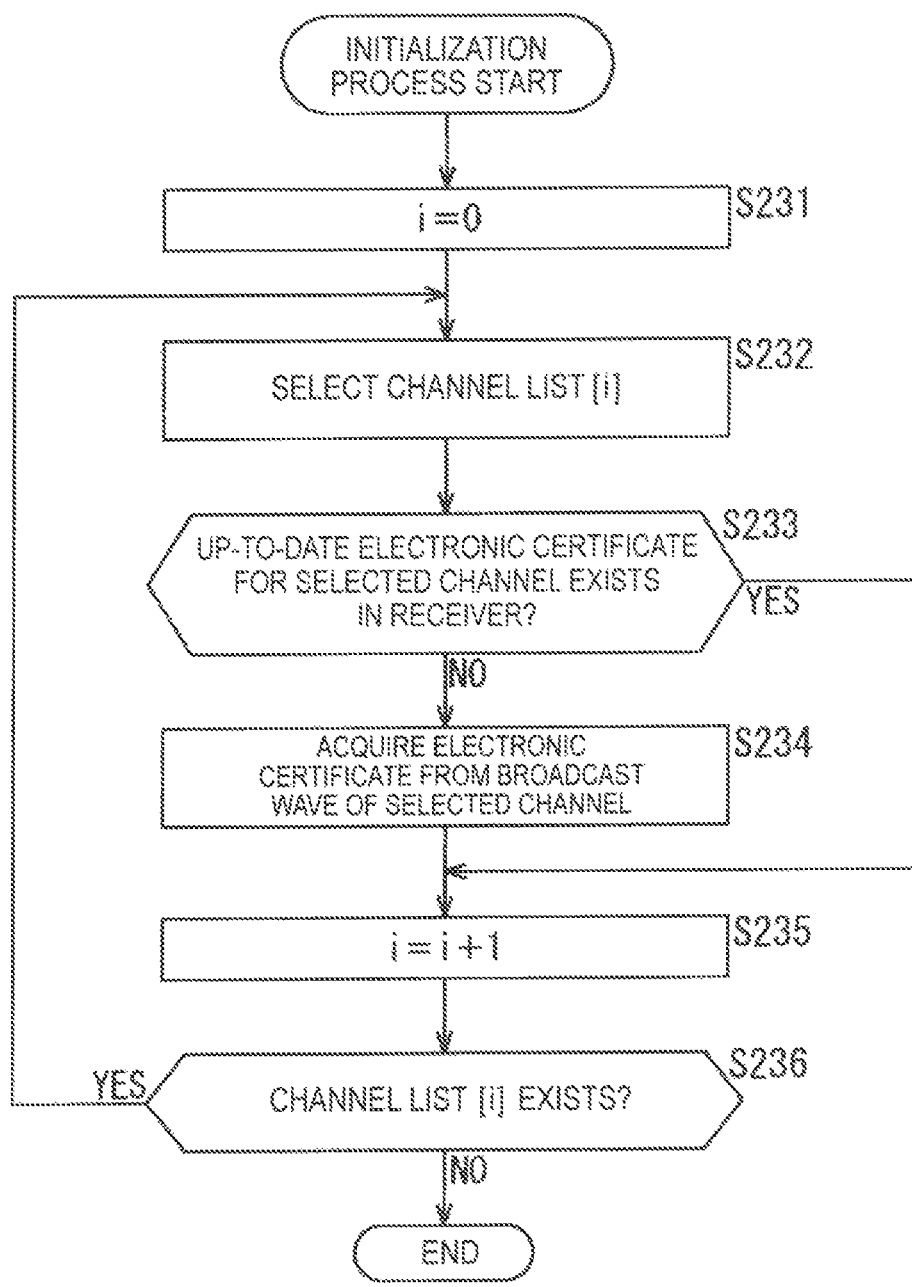
FIG. 12 is a flowchart explaining an initialization process.

Note that although the foregoing description describes an example of including correspondences between an electronic certificate ID and a channel in the electronic program guide, correspondences between the selected channel and an electronic certificate ID may also be made when executing the initialization process of FIG. 12 in the reception device 20, and such correspondence relationships may be stored in the memory 212 as a database. Basically, it is sufficient to be able to recognize correspondence relationships between a channel and an electronic certificate ID, and the method of acquiring such correspondence relationships is arbitrary.

The above thus describes the electronic certificate acquisition process.

(Application Provision Process)

Figure 17:
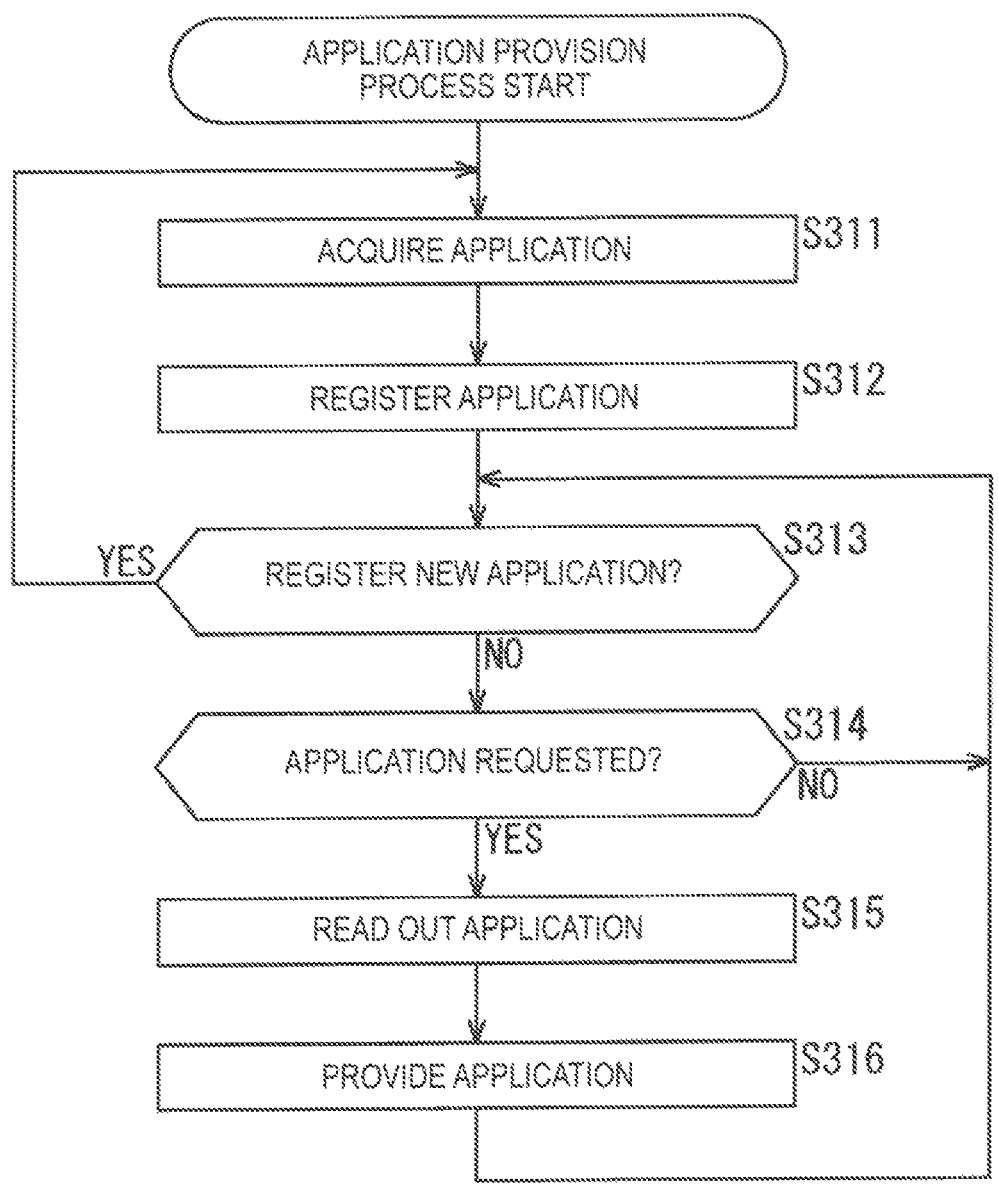
FIG. 17 is a flowchart explaining an application provision process.

Lastly, an application provision process executed by the application server 30 of FIG. 5 will be described with reference to the flowchart in FIG. 17.

In step S311, the application acquisition unit 302, under control by the control unit 301, acquires an application. Additionally, in step S312, the application acquisition unit 302, under control by the control unit 301, registers the acquired application in the application storage unit 303.

In step S313, the control unit 301 determines whether or not to register a new application. In step S313, in the case of determining to register a new application, the process returns to step S311, and a new application is acquired and registered. On the other hand, in step S313, in the case of determining not to register a new application, the process proceeds to step S314.

In step S314, the control unit 301 monitors the communication unit 304, and thereby determines whether or not the reception device 20 has requested an application. In step S314, in the case of determining that an application has not been requested, the process returns to step S313, and the processing discussed above is repeated. On the other hand, in step S314, in the case of determining that an application has been requested, the process proceeds to step S315.

In step S315, the control unit 301 reads out an application from the application storage unit 303 according to the request from the reception device 20. In step S316, the communication unit 304, under control by the control unit 301, provides (transmits) the application read out from the application storage unit 303 to the requesting reception device 20. After the processing in step S316 finishes, the process returns to step S313, and the processing thereafter is repeated.

The above thus describes the application provision process.

Note that in the foregoing description, the reception device 20 is described as receiving broadcast content transmitted from the transmission device 10, but the reception device 20 may also performing streaming playback by receiving communication content delivered by a delivery server (not illustrated) provided on the Internet 90. In this case, the application operates together with the communication content. For example, the communication content is audio-visual (AV) content such as an already-broadcast TV program, an already-premiered movie, or an original video program delivered by video on demand (VOD). In other words, the broadcast content and the communication content are examples of AV content.

Figure 15:
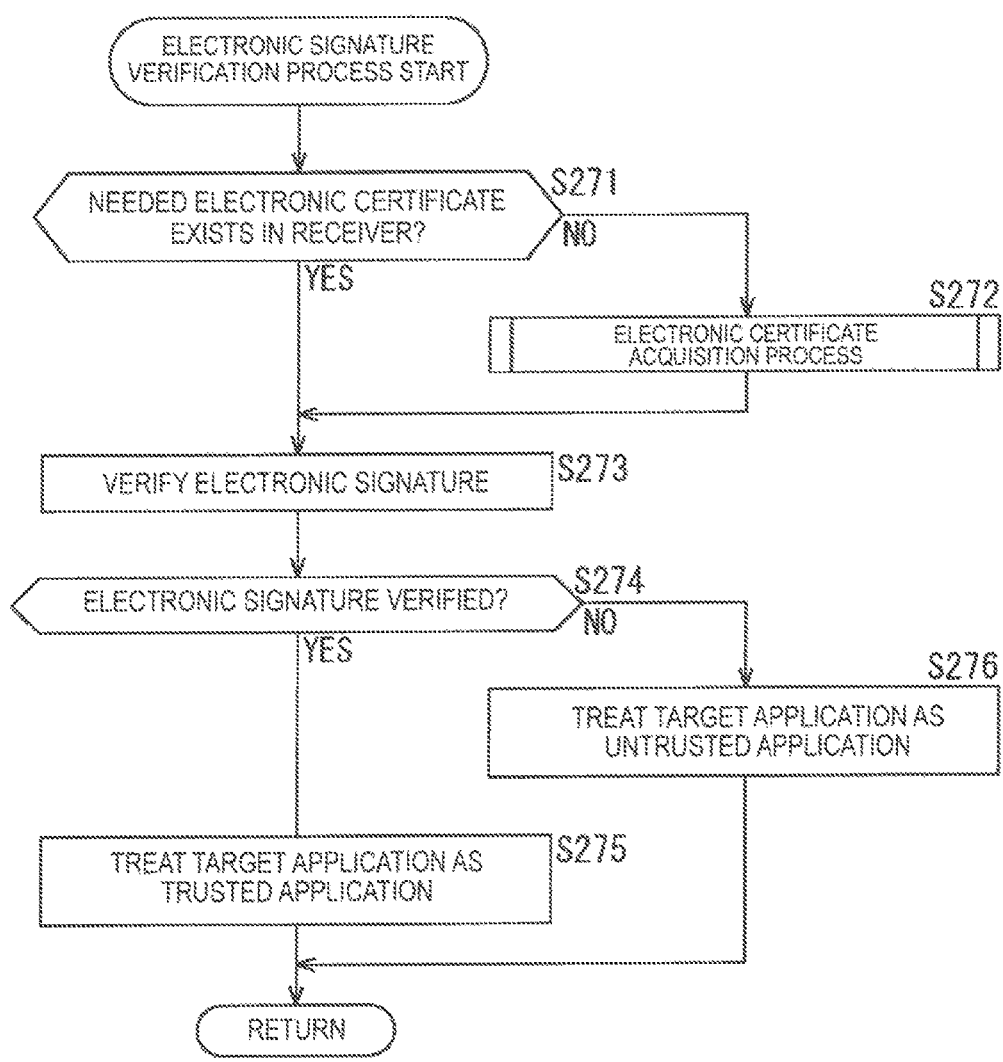
FIG. 15 is a flowchart explaining an electronic signature verification process.
Figure 16:
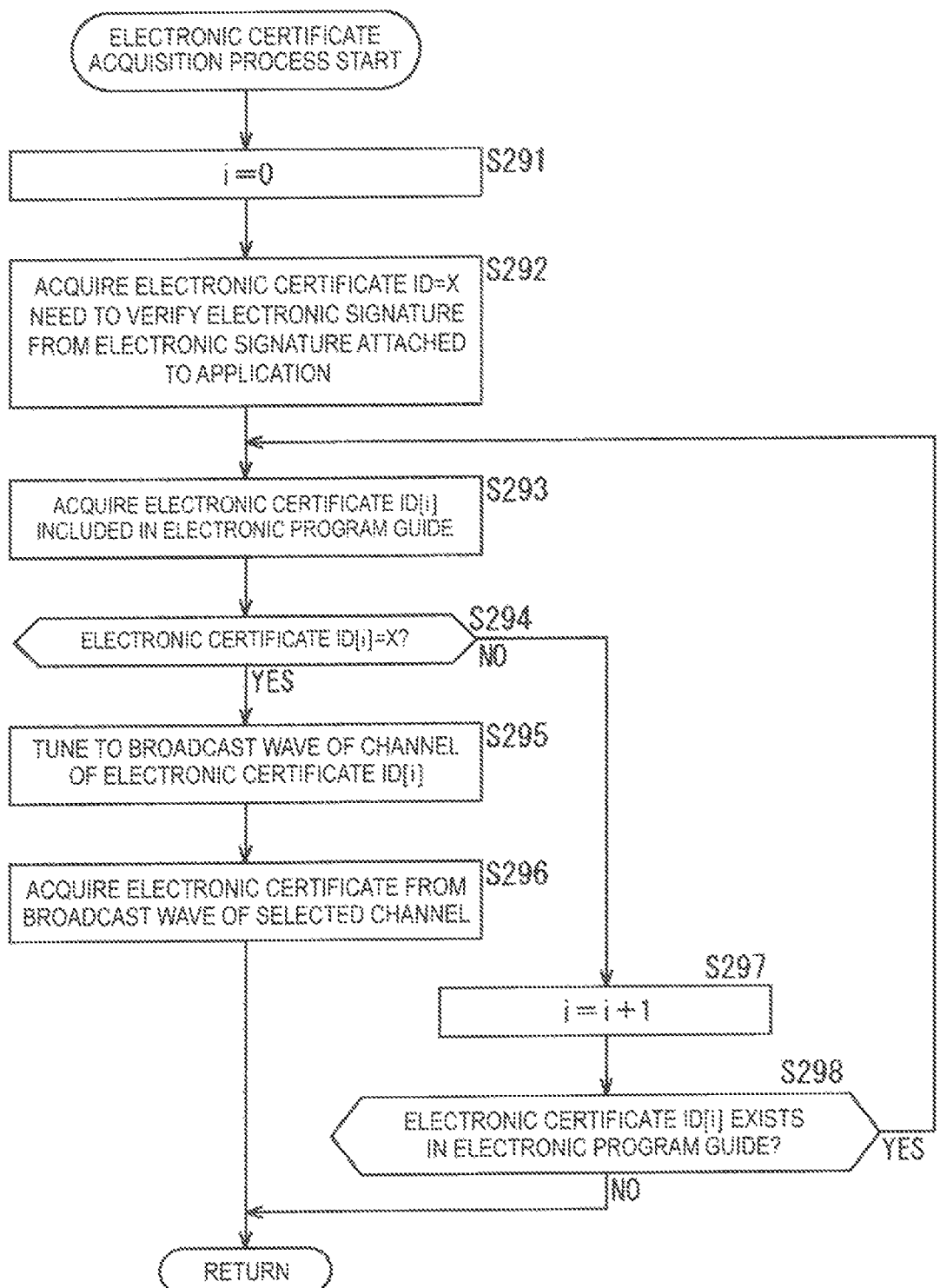
FIG. 16 is a flowchart explaining an electronic certificate acquisition process.

In addition, a dedicated verification server (not illustrated) that conducts a process of verifying an electronic signature attached to an application may be provided on the Internet 90, and the reception device 20 may control operation of an application according to a process result of the electronic signature verification process from the verification server, without conducting the electronic signature verification process in FIG. 15.

<Computer to which the Present Technology is Applied>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 18:
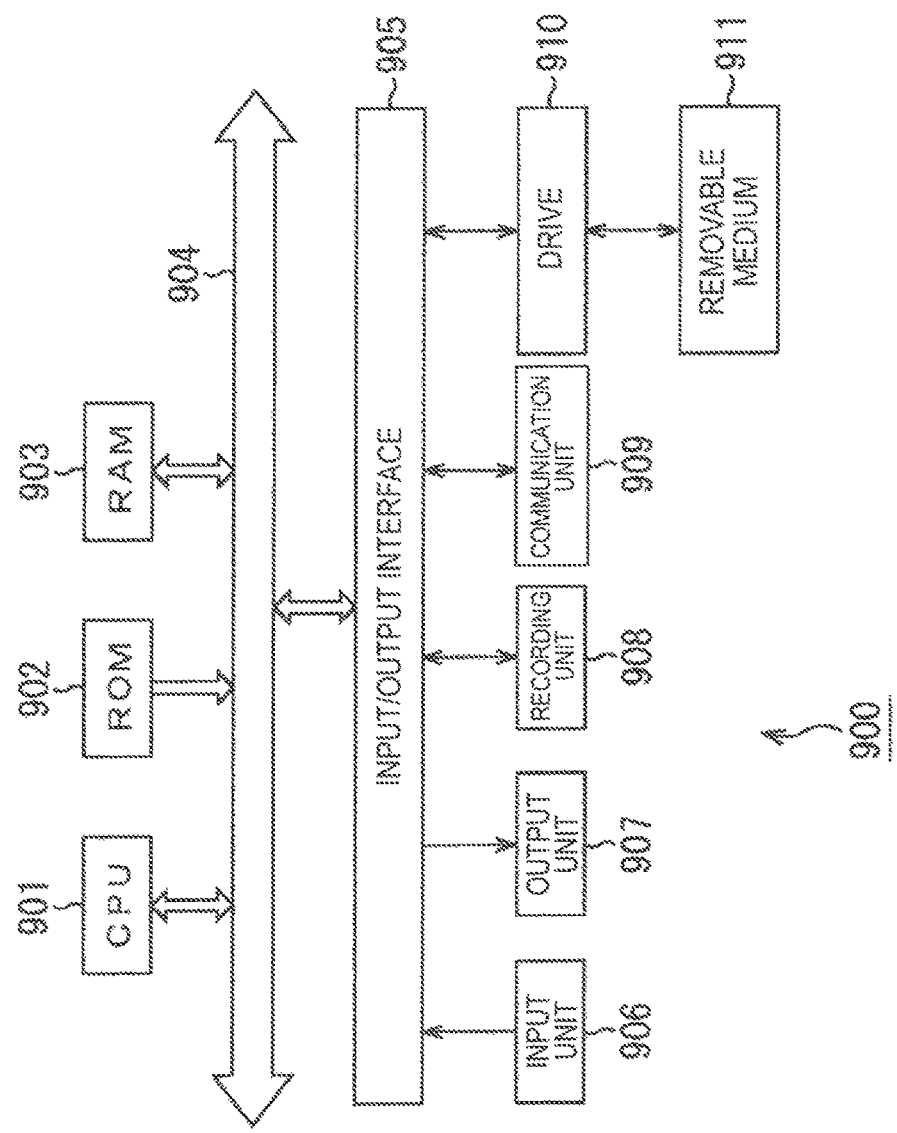
FIG. 18 is a diagram illustrating an exemplary configuration of a computer.

FIG. 18 is a block diagram showing an example configuration of the hardware of a computer that executes the series of processes described earlier according to a program.

In a computer 900, a CPU (Central Processing Unit) 901, a ROM (Read Only Memory) 902, and a RAM (Random Access Memory) 903 are mutually connected by a bus 904. An input/output interface 905 is also connected to the bus 904. An input unit 906, an output unit 907, a recording unit 908, a communication unit 909, and a drive 910 are connected to the input/output interface 905.

The input unit 906 is configured from a keyboard, a mouse, a microphone or the like. The output unit 907 configured from a display, a speaker or the like. The recording unit 908 is configured from a hard disk, a non-volatile memory or the like. The communication unit 909 is configured from a network interface or the like. The drive 910 drives a removable medium 911 such as a magnetic disk, an optical disk, a magneto-optical disk, a semiconductor memory or the like.

In the computer 900 configured as described above, as one example the CPU 901 loads a program stored in the recording unit 908 via the input/output interface 905 and the bus 904 into the RAM 903 and executes the program to carry out the series of processes described earlier.

As one example, the program executed by the computer 900 (the CPU 901) may be provided by being recorded on the removable medium 911 as a packaged medium or the like. The program can also be provided via a wired or wireless transfer medium, such as a local area network, the Internet, or a digital satellite broadcast.

In the computer 900, by loading the removable medium 911 into the drive 910, the program can be installed into the recording unit 908 via the input/output interface 905. It is also possible to receive the program from a wired or wireless transfer medium using the communication unit 909 and install the program into the recording unit 908. As another alternative, the program can be installed in advance into the ROM 902 or the recording unit 908.

Note that the program executed by the computer 900 may be a program in which processes are carried out in a time series in the order described in this specification or may be a program in which processes are carried out in parallel or at necessary timing, such as when the processes are called.

In the specification herein, process steps stating a program for causing the computer 900 to perform various processes are not strictly limited to being processed in a time series following the order depicted in the flowchart, but may also be processed in parallel or individually (such as by parallel processing or object-orientated processing, for example). Also, while the program may be processed by a single computer, the program may also be processed in a distributed manner by multiple computers. Furthermore, the program may also be transferred to a remote computer and executed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure. For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses. In addition, in the case where a plurality of processes are included in one step, the plurality of processes included in this one step can be executed by one apparatus or by sharing a plurality of apparatuses.

Additionally, the present technology may also be configured as below.

(1)

A reception device including:

a content reception unit configured to receive AV content;

an application acquisition unit configured to acquire an application that operates together with the AV content; and an application control unit configured to control operation of the application according to a verification result of whether or not the application is trustworthy.

(2)

The reception device according to (1), wherein the AV content is broadcast content transmitted by a broadcast wave, and wherein the reception device further includes an electronic certificate acquisition unit configured to acquire an electronic certificate, transmitted by the broadcast wave, for verifying an electronic signature attached to the application, and an electronic signature verification unit configured to use the electronic certificate to verify the electronic signature attached to the application.

(3)

The reception device according to (1) or (2), wherein the application control unit launches and executes the application only when the application is trustworthy.

(4)

The reception device according to (2) or (3), wherein the electronic certificate is a certificate shared in common with respective channels.

(5)

The reception device according to (2) or (3), wherein the electronic certificate is a different certificate for each channel.

(6)

The reception device according to (2) or (3), wherein an electronic program guide transmitted by the broadcast wave associates an identifier of the electronic certificate with each channel, and wherein the electronic certificate acquisition unit acquires, on a basis of the electronic program guide, the electronic certificate from a broadcast wave of a channel corresponding to the identifier of the electronic certificate obtained from the electronic signature attached to the application.

(7)

The reception device according to any one of (2) to (6), wherein the electronic certificate is shared with another electronic device on a same network.

(8)

The reception device according to any one of (1) to (7), wherein the application acquisition unit acquires the application from a designated server via a network.

(9)

A reception method of a reception device, the reception method including the steps of, by the reception device:

receiving AV content;

acquiring an application that operates together with the AV content; and controlling operation of the application according to a verification result of whether or not the application is trustworthy.

(10)

A transmission method including the steps of:

acquiring an electronic certificate for verifying an electronic signature attached to an application that operates together with AV content;

transmitting the electronic certificate together with the AV content;

acquiring the application with the electronic signature attached; and transmitting the application.

(11)

The transmission method according to (10), wherein the AV content is broadcast content transmitted by a broadcast wave, and wherein the electronic certificate is transmitted by the broadcast wave together with the broadcast content.

(12)

The transmission method according to (10) or (11), wherein the application is transmitted via a network in response to a request from a receiver.

REFERENCE SIGNS LIST 1 integrated broadcast-broadband system
10 transmission device
20 reception device
30 application server
40 terminal device
90 internet
101 electronic certificate acquisition unit
107 transmission unit
202 tuner
210 control unit
212 memory
213 communication unit
251 electronic certificate acquisition unit
252 application acquisition unit
253 electronic signature verification unit
254 application control unit
301 control unit
302 application acquisition unit
304 communication unit
900 computer
901 CPU

The invention claimed is:

1. A reception device, comprising:
a central processing unit (CPU) configured to:
for one of a plurality of channels,
determine whether an electronic certificate corresponding to the one of the plurality of channels is stored in the reception device; and
receive a broadcast signal on the one of the plurality of channels and acquire, when the electronic certificate is determined to not be stored in the reception device, the electronic certificate from the broadcast signal received on the one of the plurality of channels;
receive an audio-video (AV) content on the one of the plurality of channels transmitted via the broadcast signal;
acquire at least a first application attached with information and a second application not attached with the information;
list the first application and the second application for a user to select; and
execute the first application when selected by the user and output the AV content concurrently based on a verification of the information, wherein
the CPU verifies the information based on the electronic certificate corresponding to the one of the plurality of channels on which the AV content is received.

2. The reception device according to claim 1, wherein the information corresponds to an electronic signature.

3. The reception device according to claim 2, wherein the CPU is further configured to launch and execute the first application based on a determination that the first application is trustworthy, and
the CPU determines whether the first application is trustworthy based on whether the information is verified by the CPU.

4. The reception device according to claim 1, wherein each channel of the plurality of channels is associated with a different certificate.

5. The reception device according to claim 1, wherein an electronic program guide transmitted via the broadcast signal includes an identifier of the electronic certificate for the one of the plurality of channels.

6. The reception device according to claim 1, wherein the CPU is further configured to share the electronic certificate with an electronic device connected to the reception device via a network.

7. The reception device according to claim 1, wherein the CPU is further configured to acquire the first application from a server via a network.

8. A reception method, comprising:
for one of a plurality of channels,
determining, by a central processing unit (CPU) of a reception device, whether an electronic certificate corresponding to the one of the plurality of channels is stored in the reception device;
receiving a broadcast signal on the one of the plurality of channels and acquiring, when the electronic certificate is determined to not be stored in the reception device, the electronic certificate from the broadcast signal received on the one of the plurality of channels;

receiving audio-video (AV) content on the one of the plurality of channels transmitted via the broadcast signal;

acquiring at least a first application attached with information and a second application not attached with the information;

listing the first application and the second application for a user to select; and executing, by the CPU, the first application when selected by the user and outputting the AV content concurrently based on a verification of the information, wherein the CPU verifies the information based on the electronic certificate corresponding to the one of the plurality of channels on which the AV content is received.

9. A transmission method, comprising:

acquiring, by a transmission device, an electronic certificate for one of a plurality of channels, the electronic certificate being used by a reception device to verify an electronic signature attached to a first application executed by the reception device concurrently with an output of an audio-video (AV) content;

transmitting the electronic certificate on a broadcast signal of the one of the plurality of channels;

transmitting the AV content on the one of the plurality of channels via the broadcast signal;

acquiring the first application with the electronic signature attached and a second application without the electronic signature attached; and transmitting the first application and the second application, wherein the reception device determines, for the one of the plurality of channels, whether the electronic certificate corresponding to the one of the plurality of channels is stored in the reception device, and the reception device receives the broadcast signal on the one of the plurality of channels, acquires, when the electronic certificate is not stored in the reception device, the electronic certificate from the broadcast signal received on the one of the plurality of channels transmitted by the transmission device, lists the first application and the second application for a user to select, executes the first application when selected by the user, and outputs the AV content concurrently based on a verification of the electronic signature.

10. The transmission method according to claim 9, wherein the first application is transmitted via a network based on a request received from a receiver.

11. The reception device according to claim 1, wherein
the electronic certificate includes a first identifier,
the information corresponds to an electronic signature attached to the first application, and
the electronic signature comprises a second identifier of a second electronic certificate.

12. The reception device according to claim 11, wherein the CPU is further configured to:
acquire the first identifier from the electronic certificate;
acquire the second identifier of the second electronic certificate included in the electronic signature;
compare the first identifier and the second identifier; and
verify the electronic signature attached with the first application based on the comparison.

13. The reception method of claim 8, wherein the information corresponds to an electronic signature.

14. The reception method of claim 13, wherein executing the first application comprises launching and executing the first application based on a determination that the first application is trustworthy, wherein the CPU determines whether the first application is trustworthy based on whether the information is verified by the CPU.

15. The reception method of claim 8, further comprising:
transmitting an electronic program guide via the broadcast signal, the electronic program guide including an identifier of the electronic certificate for the one of the plurality of channels.

16. The reception method of claim 8, further comprising:
sharing the electronic certificate with an electronic device connected to the reception device via a network.

17. The reception method of claim 8, further comprising:
acquiring the first application from a server via a network.

18. The reception method of claim 8, further comprising:
associating each channel of the plurality of channels with a different certificate.

* * * * *